(12) United States Patent
Mei et al.

(10) Patent No.: US 12,225,277 B2
(45) Date of Patent: Feb. 11, 2025

(54) UNDER-SCREEN CAMERA ASSEMBLY, CAMERA MODULE, OPTICAL LENS AND MANUFACTURING METHOD THEREOF

(71) Applicant: NINGBO SUNNY OPOTECH CO., LTD, Zhejiang (CN)

(72) Inventors: Zhewen Mei, Zhejiang (CN); Haipeng Pei, Zhejiang (CN); Tanaka Takehiko, Zhejiang (CN)

(73) Assignee: NINGBO SUNNY OPOTECH CO., LTD, Zhejiang (CN)

( * ) Notice: Subject to any disclaimer, the term of this patent is extended or adjusted under 35 U.S.C. 154(b) by 163 days.

(21) Appl. No.: 17/635,514

(22) PCT Filed: Jul. 7, 2020

(86) PCT No.: PCT/CN2020/100622
§ 371 (c)(1),
(2) Date: Feb. 15, 2022

(87) PCT Pub. No.: WO2021/031725
PCT Pub. Date: Feb. 25, 2021

(65) Prior Publication Data
US 2022/0279097 A1    Sep. 1, 2022

(30) Foreign Application Priority Data

Aug. 16, 2019 (CN) .......................... 201910759220.5
Aug. 16, 2019 (CN) .......................... 201910759317.6
(Continued)

(51) Int. Cl.
*H04N 23/55* (2023.01)
*G02B 9/04* (2006.01)
(Continued)

(52) U.S. Cl.
CPC ............... *H04N 23/55* (2023.01); *G02B 9/04* (2013.01); *G03B 17/12* (2013.01); *H04N 23/53* (2023.01)

(58) Field of Classification Search
CPC ...... H04N 23/55; H04N 23/53; H04N 17/002; G02B 9/04; G02B 7/021; G02B 7/025; G02B 13/0045; G02B 13/18; G03B 17/12
(Continued)

(56) References Cited

U.S. PATENT DOCUMENTS 10,025,063 B2    7/2018  Gutierrez
2006/0125951 A1*  6/2006  Akimoto ................ G02B 7/026
                                                    348/335
(Continued)

FOREIGN PATENT DOCUMENTS

CN    106461901    2/2017
CN    208367291    1/2019
(Continued)

OTHER PUBLICATIONS

International Search Report issued Oct. 14, 2020, in International (PCT) Application No. PCT/CN2020/100622, with English translation.
(Continued)

*Primary Examiner* — Usman A Khan
(74) *Attorney, Agent, or Firm* — Wenderoth, Lind & Ponack, L.L.P.

(57) ABSTRACT

An optical lens (1000) includes a first lens (110) and a second lens component (200). A central area of a first surface (112) of the first lens (110) protrudes to an object side to form a protrusion portion (111), and a top surface (113) of the protrusion portion (111) forms an optical area (113*a*), and a first structural area (115) surrounds the protrusion portion (111). The second lens component (200) includes a
(Continued)

second lens barrel (220) and at least one second lens (210), and a top of the second lens barrel (220) is provided with an extension portion (221) extending inwards, so as to form a light inlet hole (222) of the second lens component (200). Moreover, the topmost second lens (210) has a third surface (211) located at the object side, and the third surface (211) includes an optical area (211*a*) at center, an inner structural area (211*b*) surrounding the optical area (211*a*), and an outer structural area (211*c*). The outer structural area (211*c*) presses against the bottom surface of the extension portion (221), and the inner structural area (211*b*) is exposed outside the extension portion (221). The first lens (110) is bonded to the second lens component (200), and an outer diameter of the first lens (110) is not greater than a diameter of the light inlet hole (222). According to the optical lens (1000), a diameter of a hole provided on a screen can be reduced without sacrificing the imaging quality. Also disclosed are a camera module, an under-screen camera assembly, a manufacturing method of the optical lens (1000), and a manufacturing method of the camera module.

19 Claims, 9 Drawing Sheets

(30) Foreign Application Priority Data

Aug. 16, 2019 (CN) .......................... 201921332470.2
Aug. 16, 2019 (CN) .......................... 201921332700.5

(51) Int. Cl.
   *G03B 17/12* (2021.01)
   *H04N 23/53* (2023.01)

(58) Field of Classification Search
   USPC ........................................................ 348/335
   See application file for complete search history.

(56) References Cited

U.S. PATENT DOCUMENTS

| | | | |
|---|---|---|---|
| 2010/0315570 A1* | 12/2010 | Mathew | G06F 1/1637 |
| | | | 257/E27.111 |
| 2011/0063496 A1* | 3/2011 | Chang | H01R 12/7076 |
| | | | 29/842 |
| 2013/0017068 A1* | 1/2013 | Baumann | B05B 3/003 |
| | | | 416/204 R |
| 2019/0243427 A1* | 8/2019 | Nakamura | G06F 1/1626 |

FOREIGN PATENT DOCUMENTS

| | | | |
|---|---|---|---|
| CN | 208367292 | | 1/2019 |
| CN | 208432778 | | 1/2019 |
| CN | 208432778 U | * | 1/2019 |
| CN | 208569147 | | 3/2019 |
| CN | 208609068 | | 3/2019 |
| CN | 110049223 | | 7/2019 |
| CN | 210323546 | | 4/2020 |
| CN | 210323547 | | 4/2020 |
| KR | 10-2014-0076761 | | 6/2014 |

OTHER PUBLICATIONS

Extended European Search Report issued Sep. 29, 2022 in corresponding European patent application No. 20855627.4.

* cited by examiner

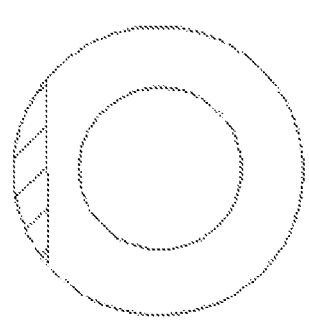
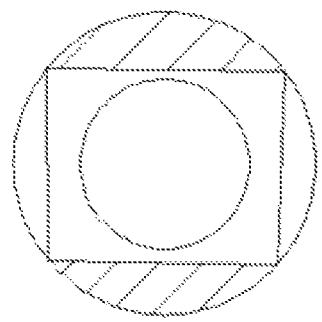
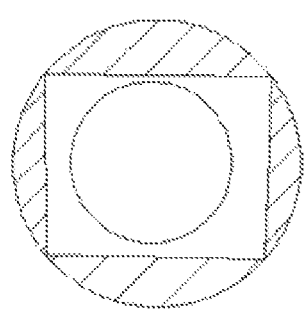
Figure 7a    Figure 7b    Figure 7c
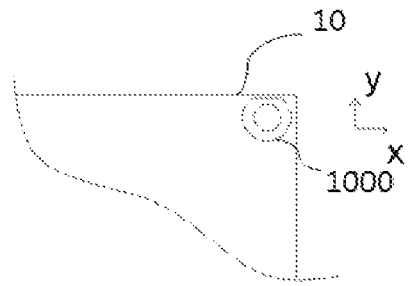
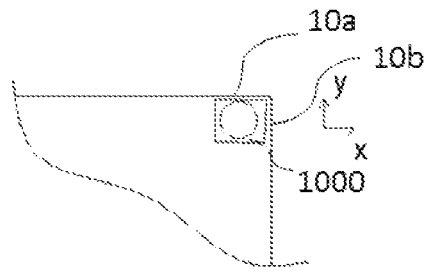
Figure 8a    Figure 8b
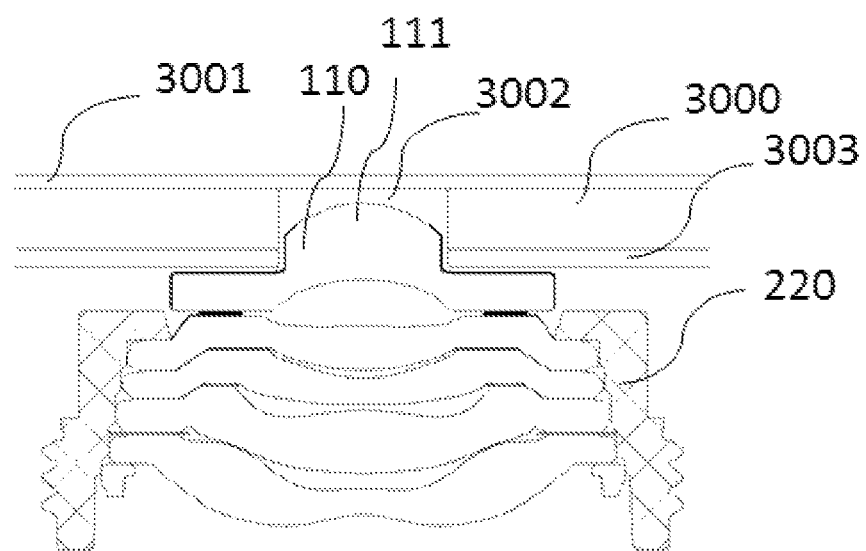
Figure 9

UNDER-SCREEN CAMERA ASSEMBLY, CAMERA MODULE, OPTICAL LENS AND MANUFACTURING METHOD THEREOF

RELATED APPLICATIONS

This application claims priorities of four patent applications of Chinese patent application number 201910759317.6 submitted on Aug. 16, 2019 titled "Under-screen camera assembly, camera module, and optical lens and its production method", Chinese patent application number 201921332470.2 filed on Aug. 16, 2019 titled "Under-screen camera assembly, camera module And optical lens", Chinese patent application number 201921332470.2 filed on Aug. 16, 2019, titled "Under-screen camera assembly, camera module, optical lens and its production method" and Chinese patent application number 201910759220.5 filed on Aug. 16, 2019 titled "under-screen camera assembly, camera module and optical lens", and the entire contents of the above-mentioned four patent applications are incorporated here by reference.

FIELD OF THE INVENTION

The present invention relates to the technical field of camera modules. Specifically, the present invention relates to an under-screen camera assembly, a corresponding camera module, an optical lens, and a manufacturing method thereof.

BACKGROUND OF THE INVENTION

With the popularization of mobile electronic devices, the related technologies of camera modules used in mobile electronic devices to help users obtain images (such as videos or images) have been developed and advanced rapidly, and in recent years, camera modules have been widely used in many fields such as medical treatment, security, industrial production and so on.

In the field of consumer electronics, such as the field of smart phones, the front camera module is an indispensable assembly. The front camera module is usually provided on the same side of the display screen to satisfy the user's Selfie and other functions. However, as the screen-to-body ratio becomes larger and larger, higher and higher requirements are placed on the layout of the front camera. In order to reduce the impact of the camera on the screen-to-body ratio and realize a full screen, different manufacturers have developed a variety of solutions from different angles. One technical direction is to arrange the front camera module on the top frame of the mobile phone to form a notch or water drop screen that is close to the full screen. Another technical direction is the use of telescopic camera modules to hide and use the camera. When shooting is required, the camera can be controlled to extend out of the casing of the mobile phone (or other electronic equipment) for shooting; after the shooting is completed, the camera is retracted into the casing of the mobile phone (or other electronic equipment). However, the camera is prone to be impacted by external forces during the continuous expansion and contraction process and when the camera is extended relative to the mobile phone (or other electronic equipment), which may cause damage to the front camera, and it is difficult to replace it.

At present, an "open-hole screen" solution is often used in the market, and the "open-hole screen" solution usually cooperates with an under-screen camera module to achieve the largest possible increase in the screen-to-body ratio of the mobile phone. The "open-hole screen" means that by canceling part of the structure of the screen that affects the light received by the lens, a hole that can transmit visible light is formed, and a camera module is provided at the position corresponding to the hole, so as to realize the front-facing shooting of the mobile phone, and increased screen-to-body ratio as much as possible. However, the head size of the current camera module is above 3 mm. Putting the head of the camera module into the hole will make the size of the screen opening large enough. When the camera module is placed behind the screen, considering the requirements of the viewing angle of the camera module, the sidewall of the screen opening cannot affect the light collected by the camera module, so the same opening needs to be relatively large, which is at least 4.5 mm or more. Such a large opening will cause the display effect of the screen to be poor, and affect the experience of using the screen. Therefore, it is expected that the openings of the "open-hole screen" are as small as possible.

On the other hand, elements such as high pixels, large aperture, and small size have become an irreversible development trend of camera modules, and consumers have continuously improved the imaging quality requirements of camera modules. Therefore, how to make the front camera module meet the requirements of high pixels, large aperture, small size, etc. without sacrificing its image quality while minimizing the opening of the "open-hole screen" is also a problem that needs to be solved urgently in the market today.

SUMMARY OF THE INVENTION

A purpose of the present invention is to overcome the shortcomings of the prior art and provide a solution for an under-screen camera assembly and corresponding optical lens and camera module. To solve the above technical problems, the present invention provides an optical lens, which includes: a first lens, the first lens has a first surface on an object side and a second surface on an image side, wherein a central area of the first surface protrudes toward the object side to form a protrusion portion, and a top surface of the protrusion portion forms an optical area for imaging, and the first surface further has a first structure area surrounding the protrusion portion, and a side surface of the protrusion portion connects the optical area and the first structure area; and a second lens component, including a second lens barrel and at least one second lens mounted inside the second lens barrel, wherein the at least one second lens and the first lens together form an imageable optical system, and a top part of the second lens barrel has an extension portion formed by extending inwardly, and a center of the extension portion is formed with a light inlet hole of the second lens component, and the topmost second lens of the at least one second lens has a third surface on the object side and a fourth surface on the image side, and the third surface includes an optical area at center and an inner structure area surrounding the optical area and an outer structure area surrounding the inner structure area, and the outer structure area bears against a bottom surface of the extension portion, and the inner structure area is exposed outside the extension portion; wherein, the first lens is adhered with the second lens component, and an outer diameter of the first lens is not larger than an aperture of the light inlet hole of the second lens component.

Wherein, the inner structure area and the outer structure area are both planes, and the inner structure area and the outer structure area are perpendicular to an optical axis of the second lens, and the inner structure area is an adhesive dispensing area, and the second surface of the first lens is bonded to the adhesive dispensing area of the topmost second lens.

Wherein, a position of the first structure area is higher than a top surface of the second lens barrel.

Wherein, the first lens and the second lens component are bonded by a first adhesive material, and the first adhesive material is cured to support the first lens and the second lens component so that relative positions of the first lens and the second lens component are maintained at relative positions determined by active calibration, and the active calibration is a process of adjusting the relative positions of the first lens and the second lens component according to an actual imaging result of the optical system; and a central axis of the first lens and a central axis of the second lens component have an included angle that is not zero.

Wherein, the second surface has an optical area for imaging and a second structural area surrounding the optical area, and a position of the second structure area is lower than the top surface of the second lens barrel, and the first adhesive material is located between an outer side surface of the first lens and the extension portion.

Wherein, in the third surface, a position of the adhesive dispensing area (the inner structure area) is higher than that of the bearing area (the outer structure area), and the adhesive dispensing area (the inner structure area) is connected to the bearing area (the outer structure area) through a connecting area.

Wherein, a light-shielding layer is attached to a transition area.

Wherein, a light-shielding layer is attached to the side surface of the protrusion portion, the first structure area, and the outer side surface of the first lens.

Wherein, the first lens is a single lens or a composite lens formed by interfitting a plurality of sub-lenses, and there are a plurality of the second lenses and the plurality of the second lenses are assemblied together by the second lens barrel.

Wherein, a minimum distance between the first lens and the topmost second lens is not less than 10 μm.

Wherein, the minimum distance between the first lens and the topmost second lens is 30-100 μm.

Wherein, at least two adjacent second lenses have optical areas, inner structure areas surrounding the optical areas, and outer structure areas surrounding the inner structure areas, and a position of the inner structure area is higher than that of the outer structure area, and the outer structure area is connected to the outer structure area by an inclined connecting area; and the at least two adjacent second lenses are fitting, a SOMA sheet is provided between the at least two adjacent second lenses, and the SOMA sheet is located between the two inner structure areas or between the two outer structure areas.

Wherein, the first lens is a molded glass lens.

Wherein, the top surface of the protrusion portion has a transition area, and the transition area is located at an edge of the top surface, and the transition area is attached with the light-shielding layer.

Wherein, a diameter of a cross section of the protrusion portion is 1.0-2.0 mm.

Wherein, a diameter of a cross section of the protrusion portion is 1.2-1.6 mm.

Wherein, a height of the protrusion portion is 0.3-1.5 mm.

Wherein, a height of the protrusion portion is 0.4-1.1 mm.

Wherein, an included angle between the side surface of the protrusion portion and the optical axis of the optical lens is less than 15°.

Wherein, a refractive index of a material for making the first lens is 1.48-1.55.

Wherein, an Abbe number of the first lens is 50.0-70.1.

Wherein, a total height of the first lens is 0.4-1.9 mm.

Wherein, a total height of the first lens is 0.6-1.5 mm.

Wherein, an outer diameter of the first lens is 3.0-4.0 mm.

Wherein, an outer diameter of the first lens is 3.2-3.8 mm.

Wherein, one or more of the side surface of the protrusion portion, the first structure area, and the outer side surface of the first lens are subjected to surface roughening treatment.

Wherein, outer side surfaces of the second lens barrel or the first lens include at least one cutting surface.

Wherein, the field of view of the optical lens is greater than 60°.

Wherein, the ratio of a diameter of a cross section of the protrusion portion to an aperture of a light inlet hole of the second lens barrel is 0.3-0.6.

Wherein, the optical lens further includes a light-shielding member including a annular light-shielding portion, and the annular light-shielding portion is provided above the first structure area.

Wherein, the light-shielding member is an annular SOMA sheet, and the SOMA sheet is bonded to the first structure area.

Wherein, the light-shielding member is a first lens barrel, and a bottom surface of the first lens barrel is bonded to a top surface of the second lens barrel, and a top portion of the first lens barrel extends toward the first lens to form the annular light-shielding portion.

Wherein, there is no adhesive material provided between the annular light-shielding portion and the first structure area.

Wherein, the light-shielding member includes an annular support member and a SOMA sheet, the annular support member surrounds the first lens, and a bottom surface of the annular support member is bonded to a top surface of the second lens barrel, a top surface of the annular support is bonded to the SOMA sheet, the SOMA sheet is annular, and the SOMA sheet constitutes the annular light-shielding portion.

Wherein, there is no adhesive material provided between the SOMA sheet and the first structure area.

Wherein, a light-shielding layer is attached to the side surface of the protrusion portion and/or an outer side surface of the first lens.

Wherein, the second surface has an optical area for imaging and a second structure area surrounding the optical area, and the light-shielding layer is attached to the second structure area. According to another aspect of the present application, there also provides a camera module including: any of the aforementioned optical lenses; and a photosensitive assembly on which the optical lens is mounted.

According to yet another aspect of the present application, there also provides an under-screen camera assembly including: a display screen having a light-through hole; and the aforementioned camera module, wherein the protrusion portion of the camera module extends into the light-through hole.

According to still another aspect of the present application, there also provides a method for manufacturing an optical lens including: 1) preparing a first lens and a second lens component separated from each other, wherein the first lens has a first surface on an object side and a second surface on an image side, and a central area of the first surface protrudes toward the object side to form a protrusion portion, and a top surface of the protrusion portion forms an optical area for imaging, and the first surface further has a first structure area surrounding the protrusion portion, and a side surface of the protrusion portion connects the optical area and the first structure area, and the second lens component includes a second lens barrel and at least one second lens mounted inside the second lens barrel; 2) pre-positioning the first lens and the second lens component, so that the at least one second lens and the first lens together form an imageable optical system; 3) actievly calibrating the first lens and the second lens component; and 4) adhereing the first lens and the second lens component so that relative positions of the first lens and the second lens component are maintained at relative positions determined by active calibration.

Wherein, in the step 1), the first lens is made by a molded glass process, and the protrusion portion is processed by a cutting or polishing process, so that an included angle between the side surface of the protrusion portion and an optical axis of the optical lens is less than 15°.

According to still another aspect of the present application, there also provides another method for manufacturing an optical lens including: 1) preparing a first lens, a second lens component and a light-shielding member separated from each other, wherein the first lens has a first surface on an object side and a second surface on an image side, and a central area of the first surface protrudes toward the object side to form a protrusion portion, and a top surface of the protrusion portion forms an optical area for imaging, and the first surface further has a first structure area surrounding the protrusion portion, and a side surface of the protrusion portion connects the optical area and the first structure area, and the second lens component includes a second lens barrel and at least one second lens mounted inside the second lens barrel, and the light-shielding member includes an annular light-shielding portion; 2) pre-positioning the first lens and the second lens component, so that the at least one second lens and the first lens together form an imageable optical system; 3) actievly calibrating the first lens and the second lens component; 4) adhereing the first lens and the second lens component so that relative positions of the first lens and the second lens component are maintained at relative positions determined by active calibration; and 5) bonding the light-shielding member and a combination of the first lens and the second lens component, so that the annular light-shielding portion is provided above the first structure area.

Wherein, in the step 1), the first lens is made by a molded glass process, and the protrusion portion is processed by a cutting or polishing process, so that an included angle between the side surface of the protrusion portion and an optical axis of the optical lens is less than 15°.

Wherein, in the step 1), the light-shielding member is a first lens barrel, and a top of the first lens barrel extends toward the first lens to form the annular light-shielding portion; and in the step 5), the first lens barrel is bonded to the second lens barrel through a third adhesive material, and the third adhesive material is arranged on a top surface of the second lens barrel, and the third adhesive material surrounds an outer side of the first lens.

Wherein, in the step 1), the light-shielding member is a annular SOMA sheet; and in the step 5), a bottom surface of the SOMA sheet is bonded to the first structure area.

Wherein, in the step 1), the light-shielding member includes an annular support memer and a SOMA sheet, and the SOMA sheet is annular and constitutes the annular light-shielding portion; and in the step 5), a bottom surface of the annular support member is bonded to a top surface of the second lens barrel, so that the annular support member surrounds the first lens, and then the SOMA sheet is then bonded on a top surface of the annular support member.

According to another aspect of the present application, there also provides a method for manufacturing a camera module including: a) manufacturing an optical lens according to any of the aforementioned methods for manufacturing a camera module; and b) assembling the optical lens and a photosensitive assembly together to obtain a camera module.

Wherein, in the step b), the optical lens are adhered together with the photosensitive assembly through a second adhesive material based on an active calibration process.

Wherein, in step b), the active calibration is performed between the second lens component and the photosensitive assembly, and active calibration between the first lens and the second lens component in step 3) is performed simultaneously with the active calibration between the second lens component and the photosensitive assembly in step b).

Compared with the prior art, the present application has at least one of the following technical effects:

1. The optical lens and camera module of the present application help to reduce the aperture of the open-hole in the screen.

2. The optical lens and camera module of the present application can reduce the influence of the aperture of the screen on the field of view of the lens.

3. The optical lens and camera module of the present application can reduce the influence of stray light on the imaging of the camera module.

4. The optical lens and camera module of the present application can improve the imaging quality of the lens.

5. The present application can reduce the size of the lens.

6. The present application can reduce the space to be reserved by the terminal device for the camera module.

7. In some examples of the present application, an ink layer can be sprayed from only one direction (i.e., sprayed from the side surface of the first lens), which reduces the process difficulty, helps to improve production efficiency and production yield, and is particularly suitable for mass production.

8. In some examples of the present application, a distance from the SOMA sheet to the first structure area of the first lens can be minimized, so that the protrusion portion of the first lens can more fully extend into the light-through hole of the display screen, thereby it is more helpful to reduce the aperture of the light-through hole of the display screen while maintaining the image quality.

BRIEF DESCRIPTION OF THE DRAWINGS

FIG. 7a shows a schematic top view of an example of an optical lens with a second lens barrel having a single cutting surface, FIG. 7b shows a schematic top view of an example of an optical lens with a second lens barrel having two cutting surfaces, and FIG. 7c shows a schematic top view of an example of an optical lens in which the second lens barrel having four cutting surfaces;

FIG. 8a shows a schematic diagram of an example in which a camera module with a cutting surface is provided at a position close to a frame of a mobile phone, and FIG. 8b shows a schematic diagram of another example in which the camera module with the cutting surface is provided at the position close to the frame of the mobile phone;

FIG. 9 shows a schematic cross-sectional view of an under-screen camera assembly in an example of the present application;

DETAIL DESCRIPTION OF THE INVENTION

Figure 1:
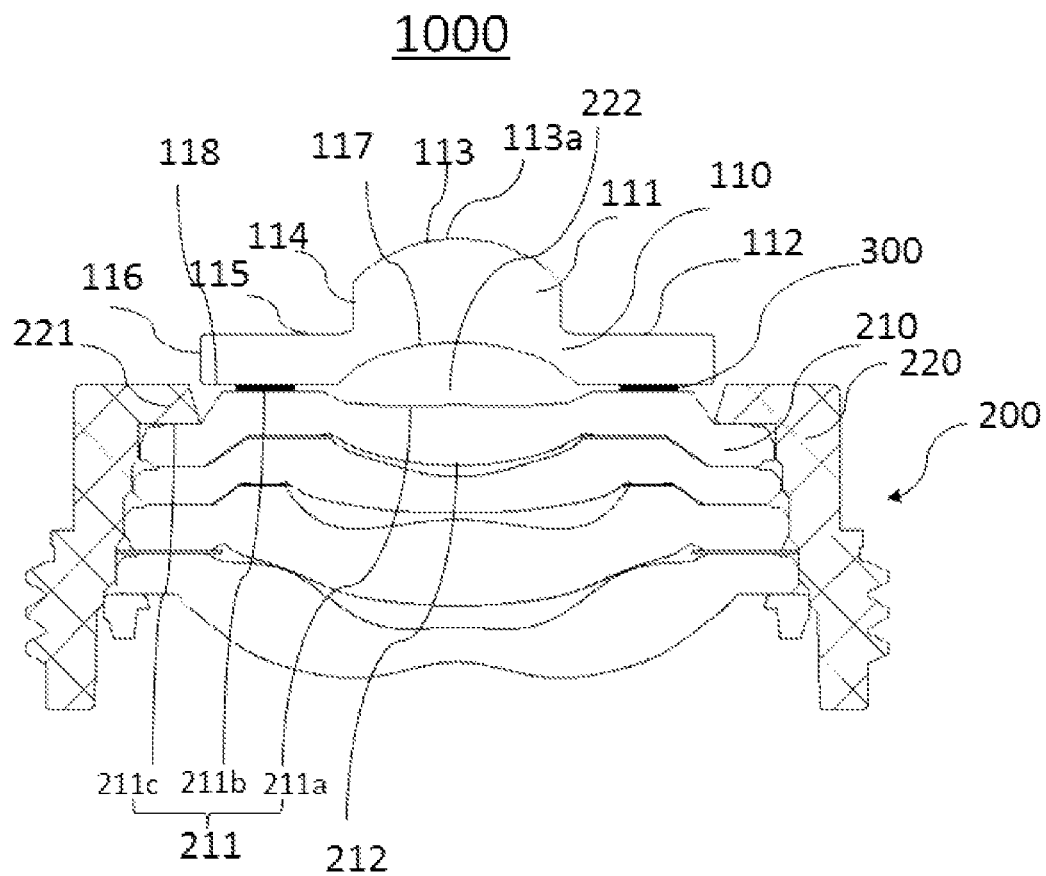
FIG. 1 shows a schematic cross-sectional view of an optical lens 1000 according to an example of the present application.

In order to better understand the present application, various aspects of the application will be described in more detail with reference to the accompanying drawings. It should be understood that these detailed descriptions are only descriptions of exemplary examples of the present application, and are not intended to limit the scope of the present application in any way. Throughout the specification, the same reference numerals refer to the same elements. The expression "and/or" includes any and all combinations of one or more of the associated listed items.

It should be noted that in this specification, expressions such as first, second, etc. are only used to distinguish one feature from another feature, and do not represent any restriction on the feature. Therefore, without departing from the teachings of the present application, the first subject discussed below may also be referred to as the second subject.

In the drawings, the thickness, size, and shape of objects have been slightly exaggerated for ease of description. The drawings are only examples and are not drawn strictly to scale. It should also be understood that the terms "comprise", "comprising", "have", "include" and/or "including" when used in this specification mean the presence of stated features, integers, steps, operations, elements and/or components, but does not exclude the presence or addition of one or more other features, integers, steps, operations, elements, components and/or combinations thereof. In addition, when the expression "at least one of . . . " appears after the list of listed features, it modifies the entire listed feature instead of modifying the individual elements in the list. In addition, when describing the examples of the present application, the use of "may" means "one or more examples of the present application". And, the term "exemplary" is intended to refer to an example or illustration.

As used herein, the terms "substantially," "approximately," and similar terms are used as approximate terms, not as terms representing degree, and are intended to illustrate the inherent deviation in the measured or calculated values the that will be recognized by those of ordinary skill in the art.

Unless otherwise defined, all terms (including technical terms and scientific terms) used herein have the same meanings as commonly understood by those of ordinary skill in the art to which the present application belongs. It should also be understood that terms (such as those defined in commonly used dictionaries) should be interpreted as having meanings consistent with their meanings in the context of related technologies, and will not be interpreted in an idealized or excessively formal sense unless this is clearly defined in this article.

It should be noted that the examples in the application and the features in the examples can be combined with each other if there is no conflict. Hereinafter, the present application will be described in detail with reference to the drawings and in combination with the examples.

FIG. 1 shows a schematic cross-sectional view of an optical lens 1000 according to an example of the present application. Referring to FIG. 1, in this example, the optical lens 1000 includes a first lens 110 and a second lens component 200. Herein, the first lens 110 can be understood as a first lens component, and in this example, the first lens component is constituted of a single first lens 110. The first lens 110 is usually a lens. The first lens 110 has a first surface 112 on an object side and a second surface 117 on an image side, and a central area of the first surface 112 protrudes toward the object side to form a protrusion portion 111, and a top surface 113 of the protrusion portion 111 forms an optical area 113a for imaging, and the first surface 112 further has a first structure area 115 surrounding the protrusion portion 111, and a the side surface 114 of the protrusion portion 111 connects the optical area 113a and the first structure area 115. Herein, a structure area is a non-optical area, which can also be referred to as an optically invalid area. In this example, the second lens component 200 includes a second lens barrel 220 and a plurality of second lenses 210 mounted inside the second lens barrel 220, and the plurality of second lenses 210 and the first lens 110 constitute an imageable optical system together. A top of the second lens barrel 220 has an extension portion 221 formed by extending inwardly. A center of the extension portion 221 is formed with a light inlet hole 222 of the second lens component 200, and a topmost second lens of the at least one second lens 210 has a third surface 211 on the object side and a fourth surface 212 on the image side. The third surface 211 includes an optical area 211a at center, an inner structure 211b surrounding the optical area, and an outer structure area 211c surrounding the inner structure area 211b. Herein, the inner structure area 211*b* can be used as an adhesive dispensing area. The outer structure area 211*c* can be used as a bearing area, which can bear against a bottom surface of the extension portion 221. The inner structure area 211*b* is exposed outside the extension portion 221 to facilitate the arrangement of the adhesive material. In this example, the second surface 117 of the first lens 110 is bonded to the inner structure area 211*b* of the topmost second lens 210. Specifically, a second structure area 118 of the second surface 117 of the first lens 110 and the adhesive dispensing area of the topmost second lens are bonded by a first adhesive material 300. The first adhesive material 300 is cured to support the first lens 110 and the second lens component 200 so that relative positions of the first lens 110 and the second lens component 200 are maintained at relative positions determined by active calibration, and the active calibration is a process of adjusting the relative positions of the first lens 110 and the second lens component 200 according to an actual imaging result of the optical system. During the active calibration process, a capture mechanism (such as a clamping mechanism) can move the first lens in multiple degrees of freedom by clamping an outer side surface of the first lens, thereby adjusting the relative positions of the first lens and the second lens component, and then find out positions that can optimize the actual imaging result of the optical system. Herein, the actual imaging result refers to an actual image received and output by a photosensitive chip provided at a rear end of the second lens. The photosensitive chip can be a photosensitive chip dedicated to the active calibration process (in this case, the photosensitive chip can be provided in an active calibration device), or it can be a photosensitive chip in an actual photosensitive assembly to be assembled (in this case, the photosensitive chip used for the active calibration will eventually be assembled with the calibrated optical lens to constitute a camera module). Since the first lens has a manufacturing tolerance during the manufacturing process, there are manufacturing tolerances and assembly tolerances between each lens in the second lens component. After the active calibration, a central axis of the first lens and a central axis of the second lens component can have a non-zero included angle, so that the aforementioned manufacturing tolerances and assembly tolerances can be compensated. The optical lens of this example is particularly suitable for a under-screen camera module. In the optical lens of this example, since the first lens 110 is exposed outside the second lens barrel 220, the protrusion portion 111 can extend into a small hole of a display screen (that is, the display screen has a light-through hole reserved for the under-screen camera module), so that a light incident surface of the optical lens is closer to an upper surface of the display screen, so that the light collected by the optical lens is less affected by a side wall of the small hole of the display screen. In this way, the optical lens can obtain a larger field of view, so that an aperture of the small hole (the reserved light-through hole) of the display screen can be reduced while ensuring the amount of light entering the optical lens. Further, in this example, the first lens is fixed on the second lens component by bonding a bottom surface of the first lens (for example, the second structure area of the second surface) and an upper surface (that is, the third surface) of the second lens, this design solution can expose the first lens to facilitate the active calibration. The shape of the first lens is specially designed, especially with the protrusion portion 111. The forming difficulty of such the first lens may be higher than that of the ordinary lens (for example, the second lens). Therefore, the manufacturing tolerance of the first lens may be higher than that of ordinary lens, and in mass production, consistency of optical parameters and performance of the first lens may also be insufficient. If the above factors are not considered, then actual imaging quality of the actual mass-produced optical lens may be lower than expected, leading to a series of problems such as a decline in production yield. In this example, the active calibration process can be used to avoid or suppress problems such as manufacturing tolerance or insufficient consistency of the first lens itself, so as to ensure the imaging quality of actual mass-produced products, and at the same time improve the production yield. In the example of the present application, a top surface of the second lens barrel may have a larger aperture. Specifically, a diameter of the outer side surface of the first lens (that is, the outer diameter of the first lens) is smaller than the aperture of the top surface of the second lens barrel. Taking into account the manufacturing tolerance, when the diameter of the outer side surface of the first lens is less than 105% of the aperture of the top surface of the second lens barrel, it can be considered that the diameter of the outer side surface of the first lens is smaller than the aperture of the top surface of the second lens barrel. It should be noted that, since the aperture of the light inlet hole of the second lens barrel can be changed along the optical axis, the aperture of the top surface of the second lens barrel cannot be directly equal to the aperture of the light inlet hole of the second lens barrel. In fact, the aperture of the top surface of the second lens barrel is an aperture of the cross section of the light inlet hole of the second lens barrel closest to the object side.

Further, still referring to FIG. 1, in an example of the present application, a bonding surface of the first lens 110 and the second lens 210 (which can be understood as an area of the bottom surface of the first lens that is in contact with the first adhesive material and an area of the third surface of the second lens that is in contact with the first adhesive material) are all set as planes. The optical lens may encounter a high temperature and high humidity environment or a mechanical impact environment. Setting the bonding surfaces of the first lens 110 and the second lens 210 as planes can reduce an influence of variation of the first adhesive material 300 caused by the above environment on the relative positions of the first lens 110 and the second lens component 200 in a horizontal direction, thereby solving or alleviating a problem of degradation of an imaging quality of the optical lens caused by the variation of the first adhesive material 300. In this example, the bonding surface of the second lens can be understood as the adhesive dispensing area on the third surface, that is, the inner structure area 211*b*.

Further, still referring to FIG. 1, in an example of the present application, the position of the first structure area 115 of the first surface 112 may be higher than the top surface of the second lens barrel 220. This design can facilitate the clamping of the outer side surface of the first lens (that is, the peripheral side of the optically invalid area) by the clamp (or called a clamping jaw), so as to complete the active calibration. Further, in a preferred example, a height difference between the first structure area 115 and the top surface of the second lens barrel 220 is greater than half of the height of the outer side surface of the first lens 110. Here, the height of the outer side surface refers to the size of the outer side surface 116 in the optical axis direction of the optical lens. Under this design, during the active calibration process, at least half of the area (at least the upper half) of the outer side surface can be conveniently clamped to facilitate the completion of the active calibration. Further, in the example of FIG. 1, the bottom surface of the first lens 110 (that is, the second structure area 118) is lower than the top surface of the second lens barrel 220, that is, a part of the first lens 110 can extend into the light inlet hole 222 formed by the extension portion 221 of the second lens barrel 220. However, it should be noted that in other examples of the present application, the second structure area 118 may also be higher than the top surface of the second lens barrel 220.

Figure 2:
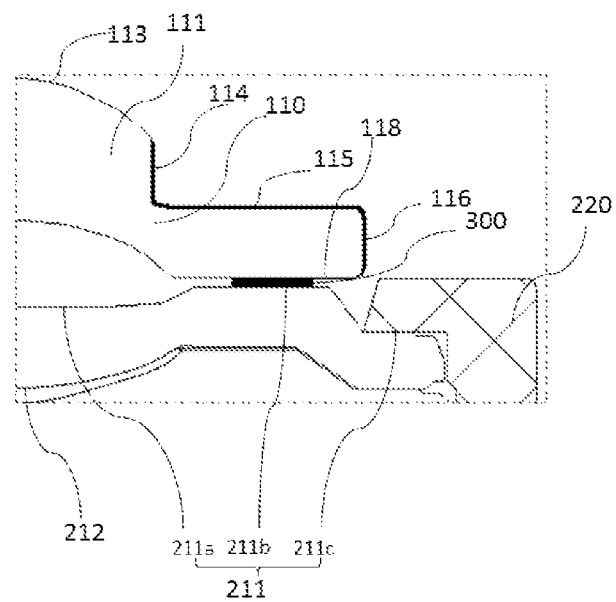
FIG. 2 shows a partial enlarged schematic diagram of a first lens and its surrounding structure in an example of the present application.

Further, FIG. 2 shows a partial enlarged schematic diagram of a first lens and its surrounding structure in an example of the present application. With reference to FIGS. 1 and 2 in combination, in this example, the side surface 114 of the protrusion portion 111 of the first lens 110, and the first structure area 115 of the first surface 112, and the outer side surface 116 of the first lens 110 are all attached with an ink layer. The second surface 117 has an optical area for imaging and a second structure area 118 surrounding the optical area. Furthermore, in an example, the second structure area 118 of the second surface 117 may also be attached with the ink layer. The ink layer attached to the above-mentioned area of the first lens 110 can play a role in reducing stray light. In addition, the ink layer can also function as a diaphragm to control the amount of light entering the camera module. That is, the diaphragm of the optical lens is provided on the first surface of the first lens. In other examples of the present application, the ink layer can also be replaced by a light-shielding layer formed of other materials attached to the above-mentioned area of the first lens, for example, an opaque material can be attached by coating to form the light-shielding layer.

Further, still referring to FIG. 1, in an example of the present application, in the optical lens, there are a plurality of second lenses 210 and the plurality of second lenses 210 are assemblied by the second lens barrel 220 together. Specifically, an inner side surface of the second lens barrel 220 may form multiple steps. When the second lens 210 is assemblied, the second lens 210 may be fitted in the multiple steps sequentially from small to large. After the plurality of second lenses 210 are assemblie d together, the position of each lens is fixed, thereby forming a stable lens group.

Further, still referring to FIG. 1, in an example of the present application, in the third surface 211 of the second lens, a position of the adhesive dispensing area (that is, the inner structure area 211b) may be higher than that of the bearing area (that is, the outer structure area 211c), the bearing area can be connected to a painting area through a connecting area. In this example, the inner structure area and the outer structure area are both planes and perpendicular to the optical axis of the second lens. The connecting area can be inclined. A connecting area of the topmost second lens can be attached with a light-shielding layer to prevent or suppress stray light from entering the optical system for imaging from the gap between the second lens barrel 220 and the second lens 210 (that is, to prevent or suppress stray light enters the imaging beam channel). In this example, the adhesive dispensing area of the topmost second lens is higher than the bearing area, so that a thickness of the second lens at the inner structure area 211b can be increased (that is, the thickness of the second lens at the inner structure area 211b can be greater than its thickness in the outer structure area 211c). This design can not only increase the reliability of the second lens, make it difficult to deform during the assembly process of the second lens component and the use process of the camera module, but also reduce the difficulty of a forming process of the second lens. Specially in the injection molding process, if the connection portion between the optically invalid area (i.e., the structural area) and the optical area is too thin, the forming accuracy of the optically invalid area and the optical area will decrease, and the imaging quality of the optical lens will decrease. However, in this example, the design solution in which the adhesive dispensing area of the second lens is higher than the bearing area can better overcome this problem.

In the foregoing examples, the first lens is a single independent lens, but the application is not limited thereto. For example, in another example of the present application, the first lens may be a composite lens formed by interfitting a plurality of sub-lens. In the active calibration phase, the composite lens can move as a whole and adjust the relative positional relationship with the second lens component.

Further, still referring to FIG. 1, in an example of the present application, in the optical lens 1000, on the premise of being assemblied by the second lens barrel 220, a plurality of second lenses 210 may also be interfited with each other, thereby further improving the stability of the lens group. Further, spacers can be provided between the plurality of second lenses 210 to improve the stability of the optical lens structure.

Figure 11:
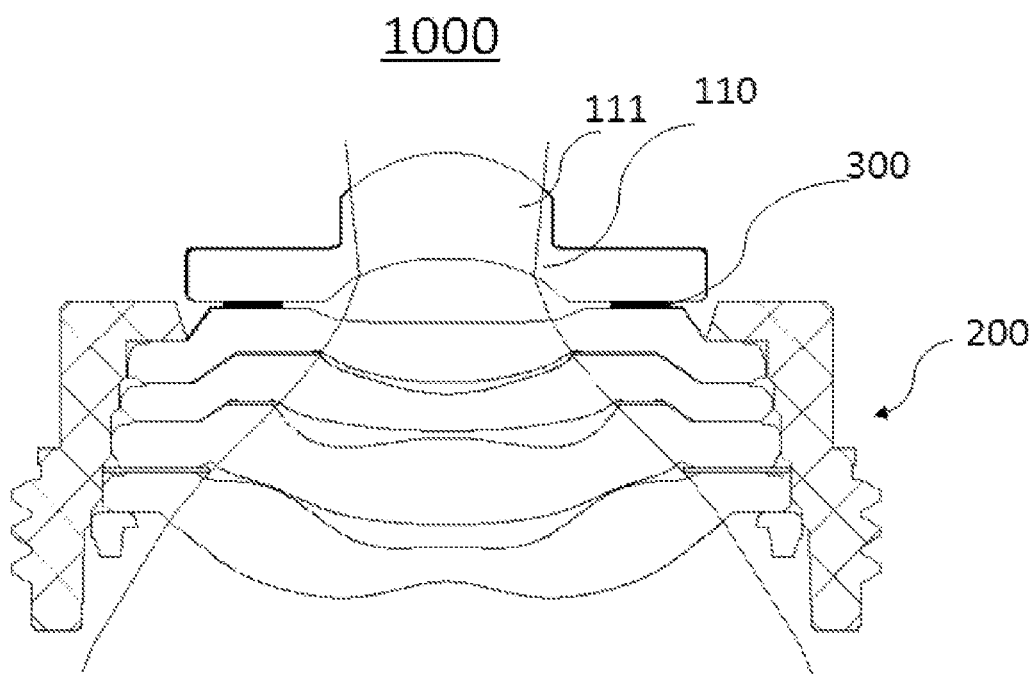
FIG. 11 shows an imaging beam channel of the optical lens 1000 in an example of the present application.

Further, still referring to FIG. 1, in an example of the present application, in the second lens component 200 of the optical lens 1000, there may be a plurality of second lenses 210 having an inner structure area 211b and an outer structure area 211c, and for a single second lens 210, its inner structure area 211b is higher than its outer structure area 211c. These second lenses with two structural areas with different heights can be fitted with each other, and a spacer (such as a SOMA sheet) is provided between the inner structural areas 211b of adjacent second lenses. The spacer can have a light-shielding effect, so as to construct the required imaging beam channel. Referring to FIG. 1, under the design of this example, the positions of the inner structure areas of the plurality of second lenses 210 may be closer to the optical axis than the position of the extension portion. Further, FIG. 11 shows an imaging beam channel of the optical lens 1000 in an example of the present application. Referring to FIG. 11, it can be seen that in this example, from the object side to the image side, a diameter of the imaging beam channel can be reduced first and then expanded. It should be noted that in the examples shown in FIGS. 1 and 11, the inner structure area 211b and the outer structure area 211c can be located not only on the surface of the object side of the second lens 210 but also on the surface of the image side of the second lens 210. For some or a certain second lens 210 (for example, the second lens located at the bottom end), it may only have a single structure area, that is, the structure area is a continuous plane with no height difference. For some or a certain second lens 210 (for example, the second lens above the second lens at the bottom end), only the surface of the object side may have an inner structure area 211b and an outer structure area 211c, while the surface of the image side may only have a single structure area, that is, the structure area on the surface of the image side is a continuous plane with no height difference.

Further, in an example of the present application, since the height of the protrusion portion of the first lens is relatively high, it has a greater impact on the transmittance of the optical lens. Therefore, in order to ensure that the photosensitive chip of the camera module can acquire more imaging light, the first lens can be made of glass. And further, since the light incident surface of the first lens is usually aspherical, the first lens may be a molded glass lens. The forming principle of molded glass lens includes: placing the glass parison with an initial shape in a molding die for precision processing, raising the temperature to soften the glass, and then applying pressure on the surface of the mold core to deform the glass and take it out of the molding die, and then the lens shape needed can be formed. Molded glass is manufactured through a molding die. After being molded, a side wall of the protrusion portion of the first lens may not be strictly parallel to an optical axis. For example, there may be a large included angle between the side wall of the protrusion portion and the optical axis (that is, an inclination of the side wall of the protrusion portion). At this time, the first lens can be grinded by cold working technology so that the included angle between the side wall of the protrusion portion of the first lens and the optical axis is less than 15 degree. In this way, it can be avoided that the maximum diameter of the protrusion portion (that is, a diameter of a root part of the protrusion portion) is too large due to the excessively large inclination of the side wall of the protrusion portion. If the diameter of the root part of the protrusion portion is too large, an aperture of an opening of the display screen has to be enlarged.

Figure 3:
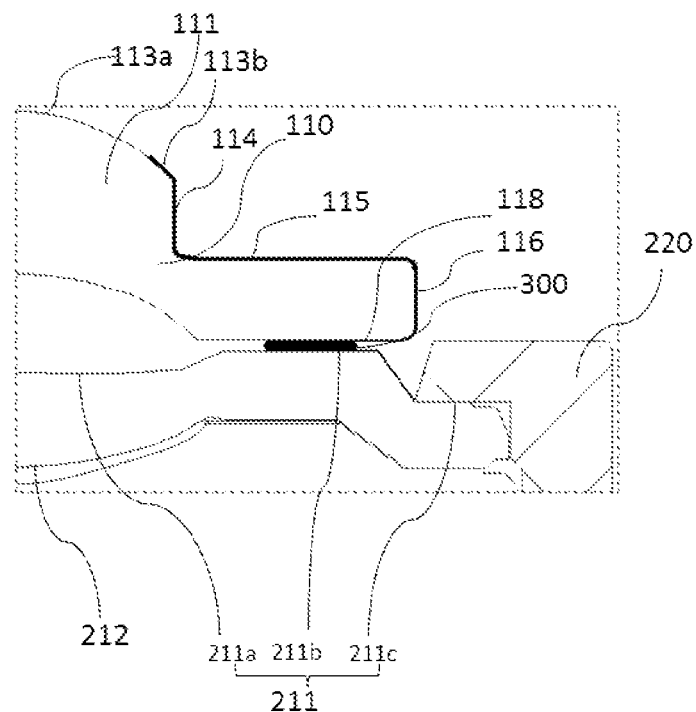
FIG. 3 shows a partial enlarged schematic diagram of a first lens and its surrounding structure in another example of the present application.

Further, FIG. 3 shows a partial enlarged schematic diagram of a first lens and its surrounding structure in another example of the present application. In this example, the top surface 113 of the protrusion portion 111 has an optical area 113a and a transition area 113b, the transition area 113b is located at an edge of the top surface 113, and the transition area 113b can be attached with an ink layer. In this example, a shape of the first lens 110 is special (for example, it has a protrusion portion 111), and during the molding and drafting process of the molded glass, the forming accuracy at the edge of the lens may be difficult to control. Therefore, in this example, there is a transition area 113b between the top surface 113 and the side surface 114 of the protrusion portion 111 of the first lens 110, and the transition area 113b can be provided (that is, attached) with a light-shielding material, so that light cannot pass through this area so as to reduce the influence of this area on optical imaging. Preferably, this transition area 113b has a width of about 0.03-0.05 mm from the side wall of the protrusion portion to the center position (the width refers to a radial dimension, that is, the dimension in the direction perpendicular to the optical axis of the optical lens). In other examples, the width of the transition area 113b may also have other values, depending on the forming accuracy of the molded glass. Further, in other examples of the present application, the first lens may also be formed of other materials other than glass. In the forming of other materials, the edge of the top surface of the protrusion portion may also have a lower forming accuracy, so the edge of the top surface of the protrusion portion may also have the transition area.

Figure 4:
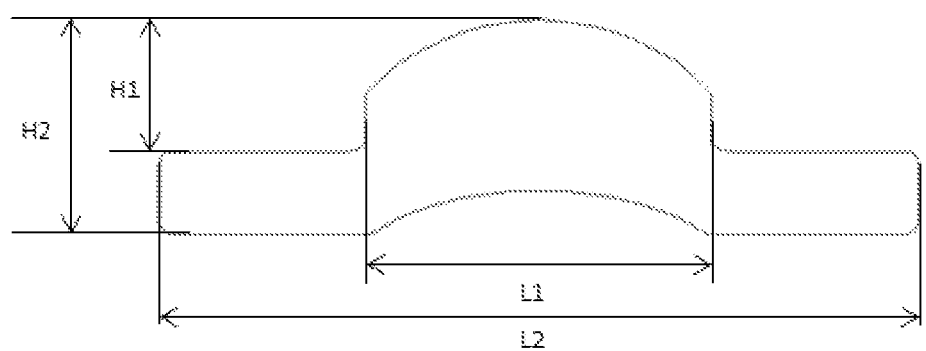
FIG. 4 shows a schematic cross-sectional view of a first lens in an example of the present application.

Further, FIG. 4 shows a schematic cross-sectional view of a first lens in an example of the present application. Referring to FIG. 4, in an example of the present application, a diameter L1 of a cross section of the protrusion portion may be 1.0-2.0 mm. Preferably, the diameter L1 of the cross section of the protrusion portion may be 1.2-1.6 mm. The above parameter ranges can be applied to the first lens made of glass material, but it should be noted that these parameter ranges are not limited to the glass material, and they can also be applied to the first lens made of other materials.

Further, still referring to FIG. 4, the first lens is directly bonded to the adhesive dispensing area of the second lens, compared with the first lens bonded to the extension portion of the second lens barrel, the structural area of the first lens can further extend downwards, so the height of the protrusion portion of the first lens can be relatively higher (refers to a comparative example where the top surface of the second lens barrel is directly bonded to the first lens, the height of the protrusion portion of the first lens in this example can be relatively higher). In order to support the lens, a minimum thickness of the extension portion of the lens barrel is about 0.3 mm. In an example of the present application, a total height H2 of the first lens may be 0.3-1.5 mm. Preferably, the total height H2 of the first lens may be 0.4-1.1 mm. Herein, the height of the protrusion portion is the height from the first structure area of the first surface to the arc top of the protrusion portion, and the height is the dimension along the optical axis of the optical lens. The above parameter ranges can be applied to the first lens made of glass material, but it should be noted that these parameter ranges are not limited to the glass material, and they can also be applied to the first lens made of other materials.

Further, still referring to FIG. 4, in an example of the present application, the total height H2 of the first lens may be 0.4-1.9 mm. Preferably, the total height H2 of the first lens may be 0.6-1.5 mm. Herein, the total height of the first lens is the height from the second structure area of the second surface to the arc top of the protrusion portion, and the height is the dimension along the optical axis of the optical lens. The above parameter ranges can be applied to the first lens made of glass material, but it should be noted that these parameter ranges are not limited to the glass material, and they can also be applied to the first lens made of other materials. Referring to FIG. 4, in this example, the thickness of the structure area of the first lens is equal to the total height of the first lens H2 subtract the height of the protrusion portion H1. Generally speaking, the smaller the thickness of the structure area of the first lens is, the more favorable the protrusion portion 111 is to extend into the light-through hole of the display screen more fully. However, if the thickness of the structure area is too small, the first lens may be easily bent during the clamping and moving process, which may cause the active calibration to fail to achieve the expected effect, which may result in a decrease in imaging quality. Specifically, if the thickness of the structure area is too small, the first lens may be bent when it is clamped. Although this bending may be very small, since the optical system (especially the optical system of the camera module of the mobile phone) is very precise and sensitive, even a very small deformation of the first lens will cause the imaging results obtained by the photosensitive chip to vary, which will cause the active calibration to fail to achieve the expected results.

Further, still referring to FIG. 4, in an example of the present application, the outer diameter L2 of the first lens may be 3.0-4.0 mm. Preferably, the outer diameter L2 of the first lens may be 3.2-3.8 mm. If the outer diameter L2 is too small, the area available for arranging the first adhesive material may become smaller, which affects the stability and reliability of the bonding. If the outer diameter L2 is too large, the first lens is prone to bend during the clamping and moving process, which may cause the active calibration to fail to achieve the expected effect, which may result in a decrease in image quality. Specifically, if the outer diameter L2 of the first lens is too large, when the first lens is clamped by the clamp, the first lens may be bent. Although this bending may be very small, since the optical system (especially the optical system of the mobile phone camera module) is very precise and sensitive, even a very small deformation of the first lens will cause the imaging result obtained by the photosensitive chip to vary, which will cause the active calibration to fail to achieve the expected effect.

The above parameter ranges can be applied to the first lens made of glass material, but it should be noted that these parameter ranges are not limited to the glass material, and they can also be applied to the first lens made of other materials.

Further, referring to FIG. 1 in combination, in an example of the present application, the first lens has a protrusion portion with a cross-sectional diameter L1 of 1.0-2.0 mm and a height H1 of 0.3-1.5 mm. The protrusion portion makes the thickness of the first lens at the optical area larger, and the difficulty of optical design is increased. Generally speaking, the ratio of the diameter of the imaging surface of the first surface of the first lens to the diameter of the imaging surface of the third surface of the second lens is about 0.80-1.25. Further, since the first lens is bonded to the adhesive dispensing area of the second lens, in order to meet the requirements of the adhesion between the first lens and the second lens and provide a larger bonding area, the width of the adhesive dispensing area can be greater than 0.3 mm (the width refers to the radial dimension, that is, the dimension in the direction perpendicular to the optical axis). Preferably, the width of the adhesive dispensing area is between 0.5 mm and 0.8 mm, so as to satisfy the adhesive arrangement and avoid the excessive radial size of the second lens component as much as possible. Based on the above parameter limitations, and further consider the connecting area between the second lens optical area 211*a* and the inner structure 211*b* (the adhesive dispensing area), and the necessary size occupied by the connecting area between the inner structure area 211*b* (the adhesive dispensing area) and the outer structure area 211*c* (the bearing area), in this example, the aperture of the extension portion of the second lens barrel is greater than 2.5 mm. Preferably, the aperture of the extension portion of the second lens barrel is between 3.0 mm and 4.4 mm. The ratio of the diameter of the cross-sectional of the protrusion portion of the first lens to the aperture of the extension portion of the second lens barrel (that is, the aperture of the light inlet hole of the second lens barrel) is approximately 0.3-0.6. Preferably, the ratio of the diameter of the cross-sectional of the protrusion portion of the first lens to the aperture of the extension portion of the second lens barrel may be 0.35-0.5.

Further, in an example of the present application, the diameter of the cross section of the protrusion portion of the first lens is less than one third of the outer diameter of the second lens barrel. The outer diameter of the second lens barrel refers to the outer diameter of the largest dimension outside the second lens barrel. The largest outside dimension of the second lens barrel is generally located at the bottom of the second lens barrel (that is, the side close to the image side in the optical system). Generally speaking, a plurality of second lenses are fitted in the second lens barrel in order from small to large, and the lens with the largest size is usually located at the bottom end. Therefore, the largest outside size of the second lens barrel is generally located at the bottom of the second lens barrel. However, it should be noted that under special circumstances, the largest outer dimension of the second lens barrel may also be located in other positions. Further, in a preferred example, the outer diameter of the second lens barrel (that is, the outer diameter of the second lens barrel where the outer dimension is the largest) is not less than 4 mm.

Further, in an example of the present application, a refractive index of the manufacturing material of the first lens is 1.48-1.55. An Abbe number of the first lens may be 50.0-70.1. The first lens usually adopts an aspheric surface. When the first lens is made of glass material, the first lens is usually made by a molded glass process. Since molded glass requires the use of a die to press the glass for processing, usually the biconcave lens produced by moldeed glass will cause greater damage to the die. Therefore, the first surface (i.e., the object side) of the first lens is preferably convex. In this example, the first lens has a relatively greater thickness relative to the lateral dimension.

Correspondingly, the refractive index of the lens forming material is preferably 1.48-1.55, and the Abbe number of the first lens is preferably 50.0-70.1, which can better control the imaging quality of the split lens.

Further, in an example of the present application, a field of view (i.e., FOV) of the optical lens is greater than 60°. As mentioned above, the optical lens of the present application has a first lens, and the first lens has a protrusion portion, which can extend into the light-through hole with a smaller aperture (referring to the light-through hole of the display screen), so the light incident surface of the optical lens (the optical area of the first surface of the first lens) can be closer to the upper surface of the display screen, so that the field of view of the optical lens is relatively less affected by the diameter of the small hole of the display screen. Therefore, in this example, the field of view (i.e., FOV) of the optical lens may be greater than 60°. Preferably, the field of view of the optical lens may be greater than 75°.

Further, in an example of the present application, the thickness of the ink layer of the first lens is greater than 5 µm. Preferably, in order to make the ink layer to have a better shading effect and at the same time to make the thickness of the ink layer less affect the height H1 of the protrusion portion 111, the thickness of the ink layer of the first lens may be 15-30 µm.

Further, in an example of the present application, in the first lens, the side surface of the protrusion portion, the first structure area of the first surface, the outer side surface of the first lens, and the second structure area of the second surface is subjected to a surface roughening treatment. The inner structure area, outer structure area and connecting area (the connecting area between the inner structure area and the outer structure area) of the topmost second lens can also be subjected to the surface roughening treatment. The surface roughening treatment can be achieved, for example, by grinding. Roughening the above-mentioned area of the first lens can not only reduce the influence of stray light on the imaging of the lens, but also improve the bonding strength of the ink layer and the lens, so that the ink is not easy to fall off during the use of the lens, and the impact of dirt on lens imaging is reduced. In a modified example, the area subjected to the surface roughening treatment may also be one, two or three of the side surface of the protrusion portion, the first structure area of the first surface, the outer side surface of the first lens, and the second structural area of the second surface.

Figure 12:
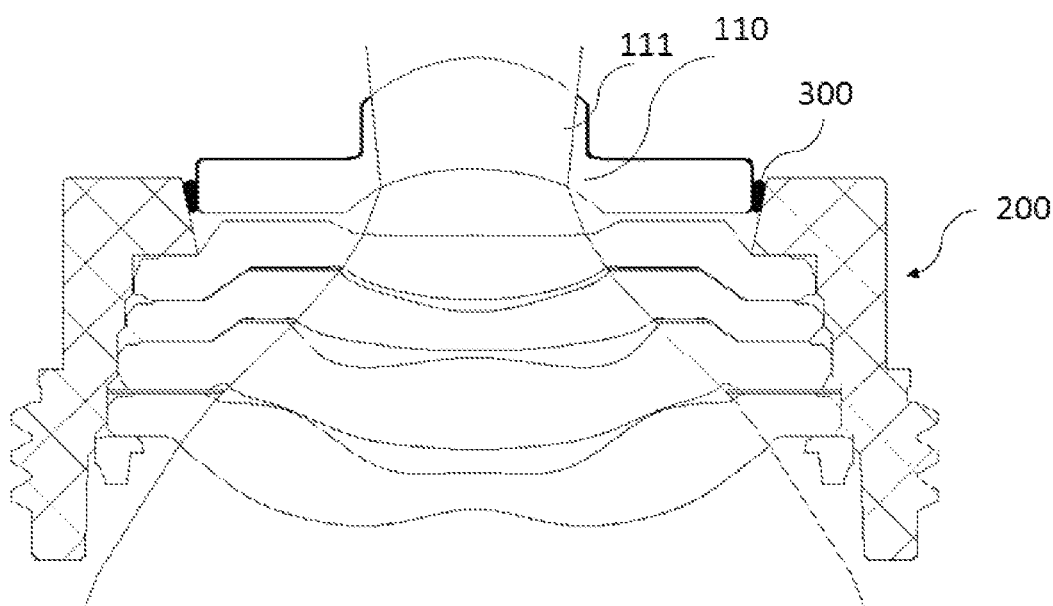
FIG. 12 shows a schematic cross-sectional view of the optical lens 1000 in a modified example of the present application.

Further, FIG. 12 shows a schematic cross-sectional view of the optical lens 1000 in a modified example of the present application. Referring to FIG. 12, in this example, the bonding position of the first lens and the second lens component is different from that in the example of FIG. 1. In this example, the bonding of the first lens and the second lens component are achieved by bonding the first lens and the side surface of the extension portion of the second lens barrel. The side surface of the extension portion can be understood as the hole wall of the light inlet hole of the second lens component (second lens barrel). The aperture of the light inlet hole can be gradually reduced from the object side to the image side, so as to arrange the first adhesive material to realize the bonding between the outer side surface of the first lens and the hole wall of the light inlet hole. Except for the bonding position, the rest of the structure and connection relationship of this example can refer to the example of FIG. 1, and will not be repeated.

It should be noted that in the above-mentioned example, a minimum gap between the first lens and the topmost second lens is greater than 10 μm, and preferably, the minimum gap may be 30-100 μm. The size of the minimum gap ensures that the active calibration has a sufficient adjustment gap, that is, it ensures that the first lens and the second lens do not interfere with each other during the active calibration (that is, the two will not collide with each other during the active calibration). The minimum gap may be the gap where the first adhesive material is arranged, or the gap at other positions.

Figure 5:
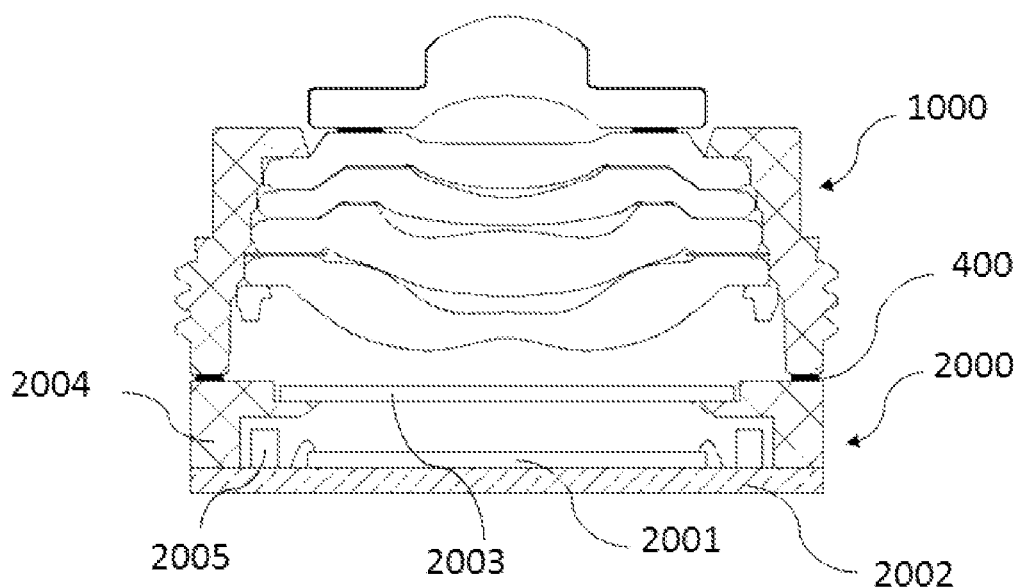
FIG. 5 shows a schematic cross-sectional view of a camera module according to an example of the present application.

Further, FIG. 5 shows a schematic cross-sectional view of a camera module according to an example of the present application. Referring to FIG. 5, according to an example of the present application, a camera module is provided. The camera module includes an optical lens 1000 and a photosensitive assembly 2000. The optical lens 1000 is mounted on the photosensitive assembly 2000. Specifically, the optical lens 1000 may be bonded to the photosensitive assembly 2000 by a second adhesive material 400. The optical lens may be the optical lens shown in FIG. 1, and its specific structure will not be repeated here. The photosensitive assembly 2000 may include a photosensitive chip 2001, a circuit board 2002, a color filter 2003, a lens holder 2004, and electronic elements 2005. The photosensitive chip 2001 is pasted on an upper surface of the circuit board 2002. The lens holder 2004 is mounted on the upper surface of the circuit board 2002 and surrounds the photosensitive chip 2001. A top surface of the lens holder can be used as a mounting surface of the optical lens 1000. The color filter 2003 is mounted in the lens holder 2004. The electronic elements 2005 can also be mounted on the upper surface of the circuit board 2002. The photosensitive chip 2001 and the circuit board 2002 can be electrically connected through a wire bonding (wire bonding also referred to as "bonding") process. The connecting wires can be gold wires or other metal wires with good conductivity.

Further, in an example of the present application, a total optical length (TTL) of the camera module may be 3.4-4.4 mm.

Figure 6:
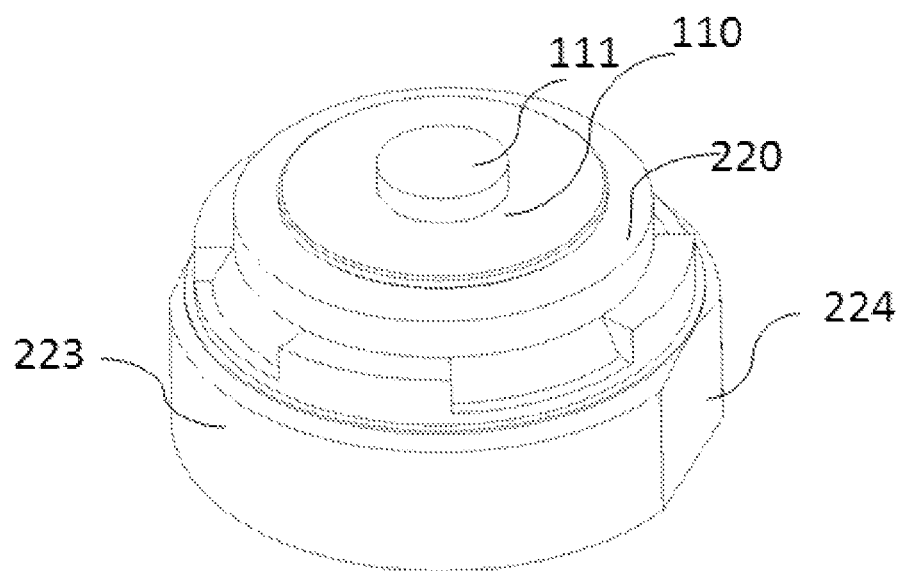
FIG. 6 shows a three-dimensional schematic diagram of an optical lens in an example of the present application.

Further, in an example of the present application, in the optical lens, the side surface of the second lens barrel may have a cutting surface. FIG. 6 shows a three-dimensional schematic diagram of an optical lens 1000 in an example of the present application. Referring to FIG. 6, in an example of the present application, the optical lens 1000 include the first lens 110 and the second lens component. The second lens component includes the second lens barrel 220 and a plurality of second lenses mounted in the second lens barrel 220 (the second lens is blocked in FIG. 6). The first lens 110 is bonded to the top surface of the second lens barrel 220. In this example, the outer side surface 223 of the second lens barrel 220 has a cutting surface 224. This cutting surface 224 can allow the front camera module to be arranged closer to the frame of the housing of the electronic device (for example, a mobile phone). FIGS. 7a, 7b, and 7c respectively show schematic top views of three cutting methods of the second lens barrel. Specifically, FIG. 7a shows a schematic top view of an example of an optical lens with a second lens barrel having a single cutting surface, and FIG. 7b shows a schematic top view of an example of an optical lens with a second lens barrel having two cutting surfaces, and 7c shows a schematic top view of an example of an optical lens with the second lens barrel having four cutting surfaces. In FIGS. 7a, 7b, and 7c, the shaded area represents the cutting area.

Further, FIG. 8a shows a schematic diagram of an example in which a camera module with a cutting surface that is provided close to the frame of the mobile phone, and FIG. 8b shows a schematic diagram of another example of a camera module with a cutting surface that is provided close to the frame of the mobile phone. It can be seen that cutting the side surface of the second lens barrel helps to provide the camera module closer to the frame of the mobile phone. As shown in FIG. 8a, the optical lens 1000 of the front camera module may have the cutting surface, and the cutting surface may be provided close to the top frame 10 of the terminal device (for example, a mobile phone). As shown in FIG. 8b, the optical lens 1000 of the front camera module may have four cutting surfaces, wherein the cutting surfaces on the top and right can be respectively provided close to the top frame 10a and the right frame 10b of the terminal device (such as a mobile phone). In FIGS. 8a and 8b, the x and y coordinate axes respectively represent two coordinate axes of the rectangular coordinate system on a plane perpendicular to the optical axis of the camera module (that is, the plane on which the display screen is located).

Further, in another example, the outer side surface of the first lens may also include a cutting surface, and the cutting surface may be one or more. The cutting method can refer to FIGS. 7a, 7b, and 7c. Further, FIG. 9 shows a schematic cross-sectional view of an under-screen camera assembly in an example of the present application. Referring to FIG. 9, according to an example of the present application, an under-screen camera assembly is provided, which includes: a display screen 3000 and a camera module (note that only the optical lens is shown in FIG. 9 and the photosensitive assembly is not shown.). The display screen 3000 has a light-through hole 3002. Specifically, the display screen 3000 has a front surface and a back surface, wherein the front surface is a side that displays the image, and the back surface is the opposite side. In the under-screen camera assembly, the display screen 3000 has the light-through hole 3002 for external light to enter the camera module located under the screen. The light-through hole 3002 may be a through hole or a blind hole. The front surface of the display screen 3000 can be covered with a transparent cover plate 3001, and the cover plate 3001 may not be penetrated at the light-through hole 3002 (as shown in FIG. 9). When the cover plate 3001 is not penetrated, that is, when the cover plate 3001 is complete, it can play a better role of dustproof and protection. It should be noted that in other examples, the cover plate 3001 at the light-through hole 3002 can also be punched through. Further, in this example, the optical lens of the camera module may be the optical lens 1000 as shown in FIG. 1, the optical lens has the first lens 110, and the first lens 110 has the protrusion portion 111. In this example, the protrusion portion 111 extends into the light-through hole 3002. The display screen 3000 may further include a substrate 3003, which is located on the back surface of the display screen 3000, because the substrate 3003 may also be referred to as a backplane. In this example, the first structure area of the first surface (i.e., the upper surface) of the first lens 110 of the camera module can bear against a bottom surface of the substrate 3003. The first structure area of the first surface bears against the bottom surface of the substrate, so that the light incident surface of the optical lens can be closer to the upper surface of the display screen (or closer to the cover plate). In this way, the optical lens can obtain a larger field of view (the field of view is represented by a dotted line in FIG. 9), and it helps to reduce the aperture of the light-through hole of the display screen under the premise of ensuring the amount of light entering the optical lens, thereby improving visual effects of the display screen and user experience. In this example, the gap between the protrusion portion 111 and the cover plate 3001 (or called the cover plate layer) of the display screen may be 0.08-0.5 mm. The gap between the protrusion portion 111 and the cover plate 3001 of the display screen can be understood as the gap between the arc top of the top surface of the protrusion portion 111 and the cover plate 3001 of the display screen. In this example, the non-optical area of the first lens can also be provided with a light-shielding layer. For the specific content, FIG. 2 and FIG. 3 and the corresponding examples in the foregoing are referred to, which will not be repeated here.

Figure 10:
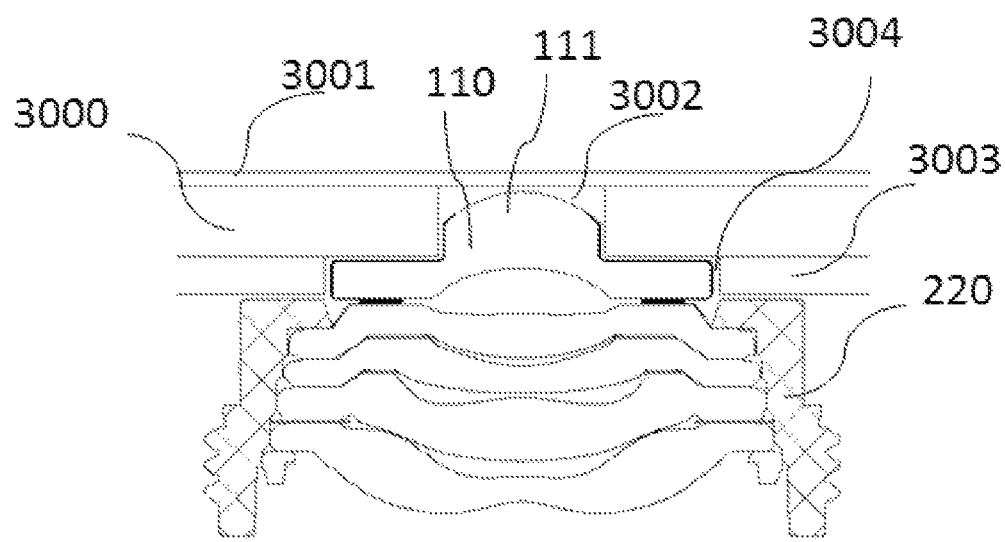
FIG. 10 shows a schematic cross-sectional view of an under-screen camera assembly in another example of the present application.

FIG. 10 shows a schematic cross-sectional view of an under-screen camera assembly in another example of the present application. Referring to FIG. 10, in another example of the present application, the substrate 3001 (or the backplane) of the display screen 3000 may have an opening 3004, and the diameter of the opening 3004 is larger than the diameter of the outer side surface of the first lens 110 (refer to FIG. 1 and the description of the corresponding example for the meaning of the outer side surface). The opening 3004 of the substrate 3003 may also be referred to as a mounting hole. The first structure area of the first surface (i.e., the upper surface) of the first lens 110 may be located in the opening 3004 and bears against the display screen 3000. That is, at least a part of the outer side surface of the first lens 110 is located in the opening 3004 (i.e., the mounting hole) of the substrate 3003. In this solution, the protrusion portion 111 can more fully extend into the light-through hole 3002 of the display screen 3000, so that the light incident surface of the optical lens is closer to the upper surface of the display screen (or closer to the cover plate). In this way, the optical lens can obtain a larger field of view (the field of view is represented by a dotted line in FIG. 10), and it helps to reduce the aperture of light-through hole of the display screen under the premise of ensuring the amount of light entering the optical lens, thereby improving the visual effects of the display screen and user experience. In this example, the gap between the protrusion portion and the cover plate (or called the cover plate layer) of the display screen may be 0.08-0.5 mm. The gap between the protrusion portion 111 and the cover plate 3001 of the display screen can be understood as the gap between the arc top of the top surface of the protrusion portion 111 and the cover plate 3001 of the display screen. In this example, the non-optical area of the first lens can also be provided with the light-shielding layer. For the specific content, FIG. 2, FIG. 3 and the corresponding examples in the foregoing are referred to, which will not be repeated here. In the foregoing example, the display screen may be an OLED display screen or an LCD display screen.

Further, according to an example of the present application, there also provides a method for manufacturing an optical lens, which includes the following steps S1-S4.

Step S1 is preparing a first lens and a second lens component separated from each other. Still referring to FIG. 1, the first lens 110 has the first surface 112 on the object side and the second surface 117 the an image side, and the central area of the first surface 112 protrudes toward the object side to form the protrusion portion 111, the top surface 113 of the protrusion portion 111 forms the optical area 113a for imaging, the first surface 112 also has the first structure area 115 surrounding the protrusion portion 111, and the side surface 114 of the protrusion portion 111 is connected to the optical area 113a and the first structure area 115. The second lens component 200 includes the second lens barrel 220 and a plurality of second lenses 210 mounted inside the second lens barrel 220, and the plurality of second lenses 210 and the first lens 110 together constitute the imageable optical system.

Step S2 is pre-positioning the first lens 110 and the second lens component 200. In this step, the first lens 110, the second lens component 200, and the photosensitive assembly (which can be a photosensitive assembly to be assembled, or a photosensitive assembly or a photosensitive chip equipped in the active calibration device) are arranged along the optical axis, so that the optical system composed of the first lens 110 and the second lens component 200 is imageable. At this time, the first lens 110 and the second lens component 200 can be regarded as split lens. In this example, the second lens component 200 may be provided on a stage, the stage may have a light-through hole, and the photosensitive assembly may be provided under the light-through hole of the stage. The first lens 110 can be clamped and moved by a six-axis movable clamp. The six axes will be explained in detail in step S3. The clamp can clamp the outer side surface of the first lens to capture and move the first lens 110. Since in this example, the outer side surface of the first lens can partially extend into the light inlet hole of the second lens barrel, the clamp can only clamp an upper half part of the outer side surface of the first lens, that is, only clamp the portion of the outer surface of the first lens close to the object side. In another example, the clamp can capture and move the first lens 110 by clamping the side surface of the protrusion portion.

Step S3 is performing the active calibration. In this step, the photosensitive assembly is energized to obtain the image formed by the split lens, and the imaging quality of the split lens and its adjustment amount are calculated through imaging algorithms such as SFR, MTF, etc. The relative position between the first lens component (the first lens component, that is, the first lens 110 in this example) and the second lens component is actively adjusted in at least one of the six-axis directions in real time according to the adjustment amount. After one or more adjustments, the imaging quality of the split lens (mainly including optical parameters such as a peak value, a field curvature, and an astigmatism) reaches the target value. Wherein, the six-axis directions can be x, y, z, u, v, w directions, wherein the x, y, and z directions are horizontal and vertical directions, that is, the directions of the three coordinate axes in the three-dimensional rectangular coordinate system, u, v, or w direction is a direction of rotation around the x, y, or z axes, respectively.

Step S4 is bonding the first lens 110 and the second lens component 200 by the first adhesive material 300. After the first adhesive material 300 is cured, the first lens 300 and the second lens component 200 can be maintained at the relative positions determined by the active calibration.

In the foregoing example, the arrangement of the first adhesive material can be performed before pre-positioning (i.e., step S2), or after completing the active calibration (i.e., step S3). When the arrangement of the first adhesive material is performed after completing the active calibration (i.e., step S3), first the first lens component is remove, and then the first adhesive material is arranged on the adhesive dispensing area (the inner structure area) of the topmost second lens of the second lens component (or arrange the first adhesive material on the side wall of the light inlet hole of the second lens component), and then step S4 is performed to cure the first adhesive material. In this application, the first adhesive material is suitable for curing by at least one of visible light, ultraviolet light, baking and the like.

Further, in an example of the present application, in the step S1, the first lens is made by a molded glass process, and the protrusion portion is processed by a removal process such as cutting or polishing, so that the included angle between the side surface of the protruding portion and the optical axis of the optical is lens less than 15°.

Further, according to an example of the present application, there also provides a method for manufacturing a camera module, which includes step a and step b.

Step a: manufacturing an optical lens according to the method for manufacturing the optical lens (steps S1-S4) in the foregoing example.

Step b, assembling the optical lens and a photosensitive assembly together to obtain a camera module.

Wherein, in the step b, based on the active calibration process, the optical lens and the photosensitive assembly are adhered together by a second adhesive material. In one example, the optical lens can be assembled first, and then the optical lens and the photosensitive assembly can be assembled. The process of assembling the optical lens and the photosensitive assembly can be a traditional active adjustment (AA) process (AA process refers to the active adjustment process without adjusting the optical system itself, that is, by adjusting the relative position between the optical lens and the photosensitive assembly, the lens and the photosensitive assembly are adhered and fixed), or the traditional holder attaching (HA) process (HA process is directly attaching the lens to the photosensitive assembly by means of mechanical positioning such as visual recognition).

Further, in another example of the present application, in the step b, the active calibration may be performed between the second lens component and the photosensitive assembly. In addition, the active calibration between the first lens and the second lens component in step S3 and the active calibration between the second lens component and the photosensitive assembly in step b can be performed simultaneously. Then the first lens and the second lens component (which can be adhered by the first adhesive material) and the second lens component and the photosensitive assembly (which can be adhered by the second adhesive) are adhered, respectively, so as to constitute a complete camera module.

Furthermore, the present application also provides an optical lens with a first lens provided with a light-shielding portion.

Figure 13:
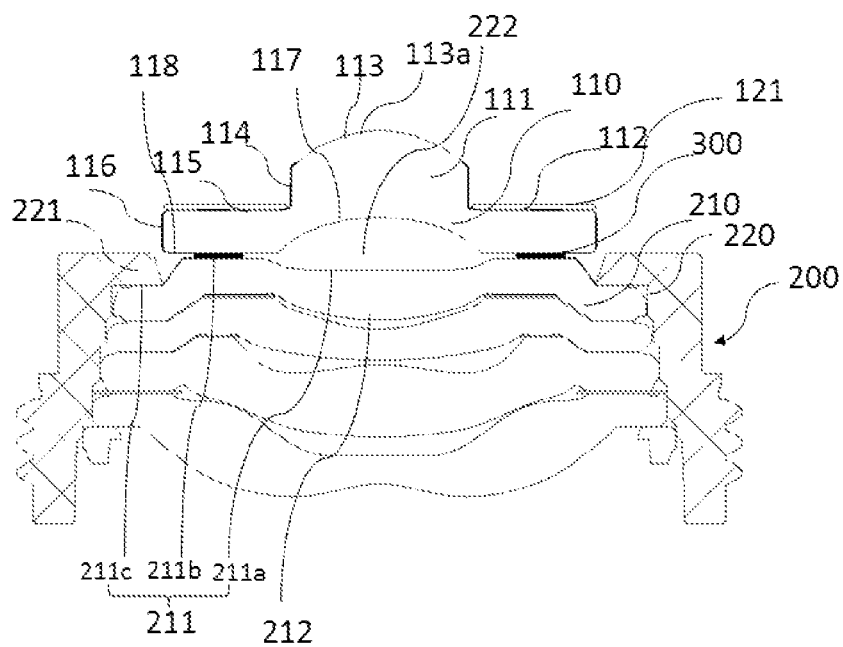
FIG. 13 shows a schematic cross-sectional view of the optical lens 1000 according to an example of the present application.

FIG. 13 shows a schematic cross-sectional view of the optical lens 1000 according to an example of the present application. Referring to FIG. 13, in this example, the optical lens 1000 includes the first lens 110, the second lens component 200 and a SOMA sheet 121. The first lens 110 can be understood as a first lens component. In this example, the first lens component is composed of a single first lens 110. The first lens 110 is usually a lens. The first lens 110 has the first surface 112 on the object side and the second surface 117 on the image side. The central area of the first surface 112 protrudes toward the object side to form the protrusion portion 111, and the top surface 113 of the protrusion portion 111 forms the optical area 113*a* for imaging. The first surface 112 also has the first structure area 115 surrounding the protrusion portion 111. The side surface 114 of the protrusion portion 111 connects the optical area 113*a* and the first structure area 115. Herein, the structure area is a non-optical area, which can also be referred to as an optically invalid area. In this example, the second lens component 200 includes the second lens barrel 220 and a plurality of second lenses 210 mounted inside the second lens barrel 220, wherein the plurality of second lenses 210 and the first lens 110 together constitute the imageable optical system. The top of the second lens barrel 220 has the extension portion 221 extending inwardly. The center of the extension portion 221 forms the light inlet hole 222 of the second lens component 200, and the topmost second lens of the at least one second lens 210 has the third surface 211 on the object side and the fourth surface 212 on the image side. The third surface 211 includes the optical area 211*a* at center, the inner structure area 211*b* surrounding the optical area and the outer structure area 211*c* surrounding the inner structure area 211*b*. Wherein, the inner structure area 211*b* can be used as the adhesive dispensing area. The outer structure area 211*c* can be used as the bearing area, which can bear against the bottom surface of the extension portion 221. The inner structure area 211*b* is exposed outside the extension part 221 to facilitate the arrangement of the adhesive material. In this example, the second surface 117 of the first lens 110 is bonded to the inner structure area 211*b* of the topmost second lens 210. Specifically, the second structure area 118 of the second surface 117 of the first lens 110 and the adhesive dispensing area of the topmost second lens are bonded by the first adhesive material 300. The first adhesive material 300 supports the first lens 110 and the second lens component 200 after it is cured, so that the relative positions of the first lens 110 and the second lens component 200 are maintained at the relative positions determined by the active calibration, wherein the active calibration is a process of adjusting the relative positions of the first lens 110 and the second lens component 200 according to the actual imaging result of the optical system. During the active calibration process, the capture mechanism (such as the clamping mechanism) can move the first lens in multiple degrees of freedom by clamping the outer side surface of the first lens, thereby adjusting the relative positions of the first lens and the second lens component, and then find out the positions that can optimize the actual imaging result of the optical system. The actual imaging result here refers to the actual image received and output by the photosensitive chip provided at the rear end of the second lens. The photosensitive chip can be a photosensitive chip dedicated to the active calibration process (in this case, the photosensitive chip can be provided in the active calibration device), or it can be the photosensitive chip in the actual photosensitive assembly to be assembled (in this case, the photosensitive chip used for active calibration will eventually be assembled with the calibrated optical lens to constitute a camera module). Since the first lens has manufacturing tolerances during the manufacturing process, there are manufacturing tolerances and assembly tolerances between the lenses in the second lens component. After the active calibration, the central axis of the first lens and the central axis of the second lens component can have a non-zero included angle, so that the aforementioned manufacturing tolerances and assembly tolerances can be compensated. The optical lens of this example is particularly suitable for use as an under-screen camera module. In the optical lens of this example, since the first lens 110 is exposed outside the second lens barrel 220, the protrusion portion 111 can extend into the small hole of the display screen (that is, the display screen has the light-through hole reserved for the under-screen camera module), so that the light incident surface of the optical lens is closer to the upper surface of the display screen, so that the light collected by the optical lens is less affected by the side wall of the small hole of the display screen. In this way, the optical lens can obtain a larger field of view, so that the aperture of the small hole (the reserved light-through hole) of the display screen can be reduced while ensuring the amount of light entering the optical lens. Further, in this example, the first lens is fixed on the the second lens component by bonding the bottom surface of the first lens (for example, through the second structure area of the second surface) and the upper surface (that is, the third surface) of the second lens, this design solution can expose the first lens to facilitate active calibration. The shape of the first lens is specially designed, especially with the protrusion portion 111. The forming difficulty of the first lens may be higher than that of the ordinary lens (for example, the second lens). Therefore, the manufacturing tolerance of the first lens may be higher than that of ordinary lenses, and in mass production, the consistency of the optical parameters and performance of the first lens may also be insufficient. If the above factors are not considered, then the actual imaging quality of the actual mass-produced optical lens may be lower than expected, leading to a series of problems such as a decline in production yield. In this example, the active calibration process can be used to avoid or suppress problems such as manufacturing tolerances or insufficient consistency of the first lens itself, so as to ensure the imaging quality of actual mass-produced products, and at the same time improve the production yield. In the solution of the present application, the top surface of the second lens barrel may have a larger aperture. Specifically, the diameter of the outer side surface of the first lens (that is, the outer diameter of the first lens) is smaller than the aperture of the top surface of the second lens barrel. Taking into account manufacturing tolerances, when the diameter of the outer side surface of the first lens is less than 105% of the aperture of the top surface of the second lens barrel, it can be considered that the diameter of the outer side surface of the first lens is smaller than the aperture of the top surface of the second lens barrel. It should be noted that since the aperture of the light inlet hole of the second lens barrel can be changed along the optical axis, the aperture of the top surface of the second lens barrel cannot be directly equal to the aperture of the light inlet hole of the second lens barrel. In fact, the aperture of the top surface of the second lens barrel is the aperture of the cross section of the light inlet hole of the second lens barrel closest to the object side. Further, in this example, the SOMA sheet 121 is bonded to the first structure area 115, so that the SOMA sheet 121 can form a light-shielding portion, thereby avoiding or inhibiting stray light from entering the optical system of the optical lens.

Figure 14:
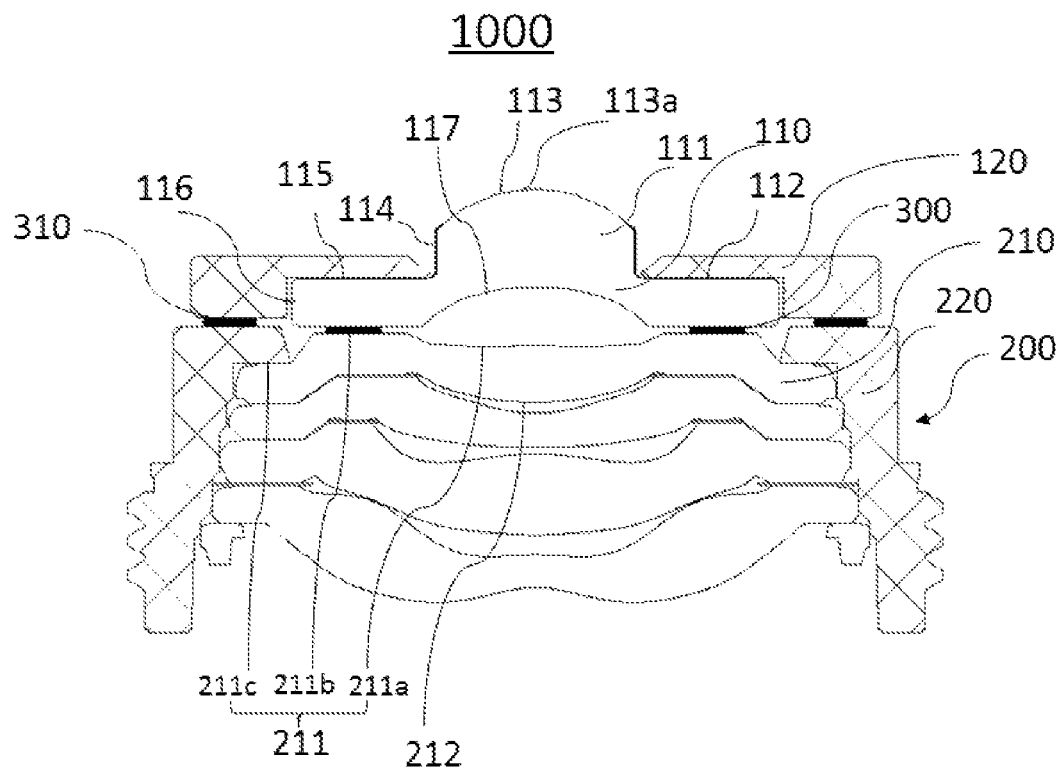
FIG. 14 shows a schematic cross-sectional view of the optical lens 1000 according to another example of the present application.

FIG. 14 shows a schematic cross-sectional view of the optical lens 1000 according to another example of the present application. Different from the example of FIG. 13, in this example, the SOMA sheet 121 is replaced by the first lens barrel 120. The bottom surface of the first lens barrel 120 is bonded to the top surface of the second lens barrel 220, and the top portion of the first lens barrel 120 extends toward the first lens 110 to form a light-shielding portion. The light-shielding portion has an annular shape and surrounds the protrusion portion 111. Further, in one example, no adhesive may be provided between the annular light-shielding portion and the first structure area 115. For example, the annular light-shielding portion may directly contact the first structure area 115. In this example, the first lens barrel 120 can play a role in shielding light, and can also play a role in protecting the first lens. It should be noted that in this application, the bonding method of the first lens barrel 120 is not limited to the above-mentioned example. For example, in another example, the bottom surface of the first lens barrel 120 may also be bonded to the top surface of the first lens 120, thereby fixing the first lens barrel to the optical lens 1000.

Figure 15:
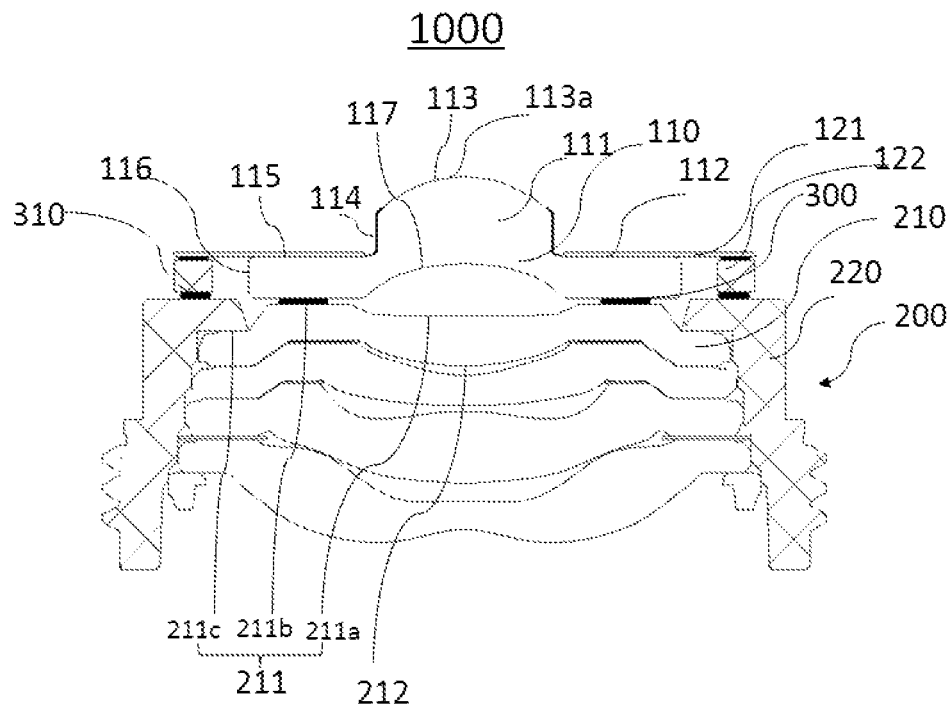
FIG. 15 shows a schematic cross-sectional view of the optical lens 1000 according to yet another example of the present application.

FIG. 15 shows a schematic cross-sectional view of the optical lens 1000 according to yet another example of the present application. Different from the example of FIG. 13, in this example, the SOMA sheet 121 is replaced by a composite light-shielding member. The composite light-shielding member includes an annular support member 122 and a SOMA sheet 121. The annular support member 122 surrounds the first lens 110. The bottom surface of the annular support member 122 is bonded to the top of the second lens barrel 220, and the top surface of the annular support member 122 is bonded to the SOMA sheet 121, the SOMA sheet 121 has an annular shape, and the SOMA sheet 121 constitutes an annular light-shielding portion that shields the first structure area 115. Further, in one example, no adhesive is provided between the SOMA sheet 121 and the first structure area. In this way, the SOMA sheet 121 can be closer to the first structure area (if the SOMA sheet 121 is pasted on the first structure area 115, then a certain thickness of adhesive material is required between the SOMA sheet 121 and the first structure area 115, resulting in the SOMA sheet 121 cannot be as close as possible to the first structure area 115), so that the protrusion portion 111 of the first lens 110 can more fully extend into the light-through hole of the display screen, so that it is more helpful to reduce the aperture of the light-through hole of the display screen on the premise of maintaining the imaging quality. In this example, the annular support member 122 can play a role in shielding light, and can also play a role in protecting the first lens.

Further, still referring to FIG. 13 (or FIG. 14 or FIG. 15), in an example of the present application, the bonding surface of the first lens and the second lens (which can be understood as the area of the bottom surface of the first lens in contact with the first adhesive material and the area of the top surface of the second lens in contact with the first adhesive material) are both set as planes. In other words, the adhesive dispensing area (the inner structure area) of the second lens and the second structure area of the first lens are both planes and perpendicular to the optical axis (the optical axis of the optical lens). The optical lens may encounter a high temperature and high humidity environment or a mechanical impact environment. Setting the bonding surface of the first lens and the second lens barrel as planes can reduce the influence of the variation of the first adhesive material on the relative positions of the first lens and the second lens barrel in the horizontal direction caused by the above environment, thereby solving or alleviating the problem of the degradation of the imaging quality of the optical lens caused by the variation of the first adhesive material.

Further, referring to FIG. 3, in an example of the present application, an ink layer is attached to the side surface 114 of the protrusion portion 111 of the first lens 110 and/or the outer side surface 116 of the first lens 110. It should be noted that the independent light-shielding member is not shown in FIG. 3. The independent light-shielding member refers to the SOMA sheet 121 shown in FIG. 13 or the first lens barrel 120 shown in FIG. 14 or the composite light-shielding member shown in FIG. 15. The ink layer can be used in combination with the light-shielding member to improve the effect of reducing stray light. In other examples of the present application, the ink layer can also be replaced by a light-shielding layer formed of other materials attached to the above-mentioned area of the first lens. For example, an opaque material can be attached to form a light-shielding layer by coating. Further, in this example, the ink layer is used in combination with an independent light-shielding member, so that only the side surface 114 of the protrusion portion 111 of the first lens 110, or the outer side surface 116 of the first lens 110, or the side surface 114 of the protrusion portion 111 of the first lens 110 and the outer side surface 116 of the first lens 110 are attached with the ink layer. Regardless of the above-mentioned arrangement manners of the ink layer, it only needs to spray the ink layer from one direction (that is, from the side surface of the first lens), thereby reducing the process difficulty, which is beneficial to improve production efficiency and production yield, and is particularly suitable for large-scale mass production.

Further, still referring to FIG. 13, in an example of the present application, a bonding surface of the first lens 110 and the second lens 210 (which can be understood as the area of the bottom surface of the first lens in contact with the first adhesive material and the area of the third surface of the second lens in contact with the first adhesive material) are both set as planes. The optical lens may encounter a high temperature and high humidity environment or a mechanical impact environment. Setting the bonding surface of the first lens 110 and the second lens 210 to planes can reduce the influence of the variation of the first adhesive material 300 on the relative positions of the first lens 110 and the second lens component 200 in the horizontal direction caused by the above environment, thereby solving or alleviating the problem of the degradation of the imaging quality of the optical lens caused by the variation of the first adhesive material 300. In this example, the bonding surface of the second lens can be understood as the adhesive dispensing area on the third surface, that is, the inner structure area 211b.

Further, still referring to FIG. 13, in an example of the present application, the position of the first structure area 115 of the first surface 112 may be higher than the top surface of the second lens barrel 220. This design can facilitate the clamping of the outer side surface of the first lens (that is, the peripheral side of the optically invalid area) by the clamp (or called the clamping jaw), so as to implement the active calibration. Further, in a preferred example, a height difference between the first structure area 115 and the top surface of the second lens barrel 220 is greater than half of the height of the outer side surface of the first lens 110. Here, the height of the outer side surface refers to the size of the outer side surface 116 in the optical axis direction of the optical lens. Under this design, during the active calibration process, at least half of the area (at least the upper half) of the outer side surface can be conveniently clamped to facilitate the completion of the active calibration. Further, in the example of FIG. 13, the bottom surface of the first lens 110 (that is, the second structure area 118) is lower than the top surface of the second lens barrel 220, that is, a part of the first lens 110 can extend into the light inlet hole 222 formed by the extension portion 221 of the second lens barrel 220. However, it should be noted that in other examples of the present application, the second structure area 118 may also be higher than the top surface of the second lens barrel 220.

Further, referring to FIGS. 13 and 3 in combination, in this example, the side surface 114 of the protrusion portion 111 of the first lens 110, the first structure area 115 of the first surface 112, and the outer side surface 116 of the first lens 110 is attached with an ink layer. The second surface 117 has an optical area for imaging and a second structure area 118 surrounding the optical area. Furthermore, in one example, the second structure area 118 of the second surface 117 may also be attached with the ink layer. The ink layer attached to the above-mentioned area of the first lens 110 can play a role in reducing stray light. In addition, the ink layer can also function as a diaphragm to control the amount of light entering the camera module. That is, the diaphragm of the optical lens is provided on the first surface of the first lens. In other examples of the present application, the ink layer can also be replaced by a light-shielding layer formed of other materials attached to the above-mentioned area of the first lens. For example, an opaque material can be attached by coating to form the light-shielding layer.

Further, still referring to FIG. 13, in an example of the present application, in the optical lens, there are a plurality of the second lens 210 and the plurality of second lenses 210 are assemblied by the second lens barrel 220 together. Specifically, the inner side surface of the second lens barrel 220 may form multiple steps. When the second lens 210 is assemblied, the second lens 210 may be fitted in the multiple steps sequentially from small to large. After the plurality of second lenses 210 are assembled together, the position of each lens is fixed, thereby forming a stable lens group.

Further, still referring to FIG. 13, in an example of the present application, in the third surface 211 of the second lens, the position of the adhesive dispensing area (i.e., the inner structure area 211b) may be higher than the position of the bearing area (i.e., the outer structure area 211c), and the bearing area can be connected to a painting area through a connecting area. In this example, the inner structure area and the outer structure area are both planes and perpendicular to the optical axis of the second lens. The connecting area can be inclined. The connecting area of the topmost second lens can be attached with a light-shielding layer to prevent or suppress stray light from entering the optical system for imaging from the gap between the second lens barrel 220 and the second lens 210 (that is, to prevent or suppress stray light enters the imaging beam channel). In this example, the adhesive dispensing area of the topmost second lens is higher than the bearing area, so that the thickness of the second lens at the inner structure area 211b can be increased (that is, the thickness of the second lens at the inner structure area 211b can be greater than its thickness in the outer structure area 211c). This design can not only increase the reliability of the second lens, make it difficult to deform during the assembly process of the second lens component and the use of the camera module, but also reduce the difficulty of the forming process of the second lens. Especially in the injection molding process, if the connection portion between the optically invalid area (i.e., the structural area) and the optical area is too thin, the forming accuracy of the optically invalid area and the optical area will decrease, and the imaging quality of the optical lens will decrease. However, in this example, the design solution in which the adhesive dispensing area of the second lens is higher than the bearing area can better overcome this problem.

In the foregoing examples, the first lens is a single independent lens, but the application is not limited thereto. For example, in another example of the present application, the first lens may be a composite lens formed by interfitting a plurality of sub-lens. In the active calibration phase, the composite lens can move as a whole and adjust the relative positional relationship with the second lens component.

Further, still referring to FIG. 13, in an example of the present application, in the optical lens 1000, under the premise of being assembled by the second lens barrel 220, a plurality of second lenses 210 can also be fitted with each other, thereby further improving the stability of the lens group. Further, spacers can be provided between the plurality of second lenses 210 to improve the stability of the optical lens structure.

Figure 19:
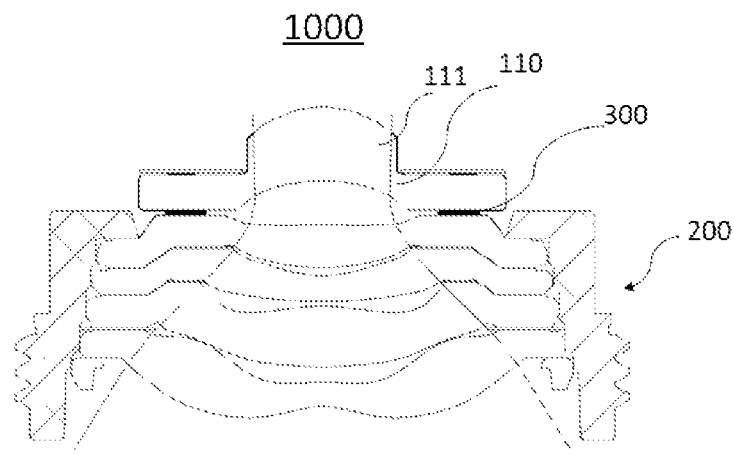
FIG. 19 shows the imaging beam channel of the optical lens 1000 in an example of the present application.

Further, still referring to FIG. 13, in an example of the present application, in the second lens component 200 of the optical lens 1000, there may be a plurality of second lenses 210 having an inner structure area 211*b* and an outer structure area 211*c*, and for a single second lens 210, its inner structure area 211*b* is higher than its outer structure area 211*c*. These second lenses with two structural areas with different heights can be fitted with each other, and a spacer (such as a SOMA sheet) is provided between the inner structural areas 211*b* of adjacent second lenses. The spacer can have a light-shielding effect, so as to construct the required imaging beam channel. Referring to FIG. 13, under the design of this example, the positions of the inner structure areas of the plurality of second lenses 210 may be closer to the optical axis than the positions of the extension portions. Further, FIG. 19 shows an imaging beam channel of the optical lens 1000 in an example of the present application. Referring to FIG. 19, it can be seen that, in this example, from the object side to the image side, the diameter of the imaging beam channel can be reduced first and then expanded. It should be noted that in the examples shown in FIGS. 13 and 19, the inner structure area 211*b* and the outer structure area 211*c* can be located not only on the surface of the object side of the second lens 210, but also on the surface of the image side of the second lens 210. For some or a certain second lens 210 (for example, a bottommost second lens), it may only have a single structure area, that is, the structure area is a continuous plane with no height difference. For some or a certain second lens 210 (for example, the second lens above the second lens at the bottom end), only the object side surface may have the inner structure area 211*b* and the outer structure area 211*c*, while the image side surface may only have a single structure area, that is, the structure area on the image side surface is a continuous plane with no height difference.

Further, in an example of the present application, since the height of the protrusion portion of the first lens is relatively high, it has a greater impact on the transmittance of the optical lens. Therefore, in order to ensure that the photosensitive chip of the camera module can acquire more imaging light, the first lens can be made of glass. And further, since the light incident surface of the first lens is usually aspherical, the first lens may be a molded glass lens. The forming principle of molded glass lens includes: placing the glass parison with an initial shape in a molding die for precision processing, raising the temperature to soften the glass, and then applying pressure from the surface of the mold core to deform the glass by force and take it out of the die, and then the lens shape needed can be formed. Molded glass is manufactured with a molding die. After being formed, a side wall of the protrusion portion of the first lens may not be strictly parallel to the optical axis. For example, there may be a large included angle between the side wall of the protrusion portion and the optical axis (that is, an inclination of the side wall of the protrusion portion). At this time, the first lens can be grinded by cold working technology so that the included angle between the side wall of the protrusion portion of the first lens and the optical axis is less than 15 degree. In this way, it can be avoided that a maximum diameter of the protrusion portion (that is, a diameter of a root part of the protrusion portion) is too large due to the excessively large inclination of the side wall of the protrusion portion. If the diameter of the root part of the protrusion portion is too large, an aperture of an opening of the display screen has to be enlarged.

Further, still referring to FIG. 3, in an example of the present application, the top surface 113 of the protrusion portion 111 has an optical area 113*a* and a transition area 113*b*, and the transition area 113*b* is located at the edge of the top surface 113, so the transition area 113*b* can be attached with an ink layer. In this example, the shape of the first lens 110 is special (for example, it has the protrusion portion 111), and during the molding and drafting process of the molded glass, the forming accuracy at the edge of the lens may be difficult to control. Therefore, in this example, there is a transition area 113*b* between the top surface 113 and the side surface 114 of the protrusion portion 111 of the first lens 110, and the transition area 113*b* can be provided (that is, attached) with a light-shielding material, so that light cannot pass through the transition area 113*b* to reduce the influence of this area on optical imaging. Preferably, the transition area has a width of about 0.03-0.05 mm from the side wall of the protrusion portion to the center position (the width refers to the radial dimension, that is, the dimension in the direction perpendicular to the optical axis of the optical lens). In other examples, the width of the transition area may also have other values, depending on the forming accuracy of the molded glass. Further, in other examples of the present application, the first lens may also be formed of materials other than glass. In the forming of other materials, the edge of the top surface of the protrusion portion may also have a lower forming accuracy, so the edge of the top surface of the protrusion portion may also have the transition area.

Further, referring to FIG. 4, in an example of the present application, the diameter L1 of the cross section of the protrusion portion may be 1.0-2.0 mm. Preferably, the diameter L1 of the cross section of the protrusion portion may be 1.2-1.6 mm. The above parameter ranges can be applied to the first lens made of glass, but it should be noted that these parameter ranges are not limited to the glass material, and they can also be applied to the first lens made of other materials.

Further, still referring to FIG. 4, the first lens is directly bonded to the adhesive dispensing area of the second lens, compared with the first lens bonded to the extension portion of the second lens barrel, the structural area of the first lens can further extend downwards, so the height of the protrusion portion of the first lens can be relatively higher (refers to a comparative example where the top surface of the second lens barrel is directly bonded to the first lens, the height of the protrusion portion of the first lens according to this example can be relatively higher), in order to support the lens, a minimum thickness of the extension portion of the lens barrel is about 0.3 mm. In an example of the present application, a total height H2 of the first lens may be 0.3-1.5 mm. Preferably, the total height H2 of the first lens may be 0.4-1.1 mm. Wherein, the height of the protrusion portion is the height from the first structure area of the first surface to the arc top of the protrusion portion, and the height is in the dimension along the optical axis of the optical lens. The above parameter ranges can be applied to the first lens made of glass, but it should be noted that these parameter ranges are not limited to the glass material, and they can also be applied to the first lens made of other materials.

Further, still referring to FIG. 4, in an example of the present application, the total height H2 of the first lens may be 0.4-1.9 mm. Preferably, the total height H2 of the first lens may be 0.6-1.5 mm. The total height of the first lens is the height from the second structure area of the second surface to the arc top of the protrusion portion, and the height is in the dimension along the optical axis of the optical lens. The above parameter ranges can be applied to the first lens made of glass, but it should be noted that these parameter ranges are not limited to the glass material, and they can also be applied to the first lens made of other materials. Referring to FIG. 4, in this example, the thickness of the structure area of the first lens is equal to the total height of the first lens H2 subtract the height of the protrusion portion H1 (that is, H2-H1). Generally speaking, the smaller the thickness of the structure area of the first lens is, the more favorable the protrusion portion 111 is to extend into the light-through hole of the display screen more fully. However, if the thickness of the structure area is too small, the first lens may be easily bent during the clamping and moving process, which may cause the active calibration to fail to achieve the expected effect, which may result in a decrease in image quality. Specifically, if the thickness of the structure area is too small, the first lens may be bent when it is clamped by the clamp. Although this bending may be very small, however, because the optical system (especially the optical system of the camera module of the mobile phone) is very precise and sensitive, even a very small deformation of the first lens will cause the imaging results obtained by the photosensitive chip to vary, which will cause the active calibration to fail to achieve the expected results.

Further, still referring to FIG. 4, in an example of the present application, the outer diameter L2 of the first lens may be 3.0-4.0 mm. Preferably, the outer diameter L2 of the first lens may be 3.2-3.8 mm. If the outer diameter L2 is too small, the area available for arranging the first adhesive material may become smaller, which affects the stability and reliability of the bonding. If the outer diameter L2 is too large, the first lens is prone to bend during the clamping and moving process, which may cause the active calibration to fail to achieve the expected effect, and may result in a decrease in image quality. Specifically, if the outer diameter L2 of the first lens is too large, when the first lens is clamped by the clamp, the first lens may be bent. Although this bending may be very small, however, because the optical system (especially the optical system of the camera module of the mobile phone) is very precise and sensitive, even a very small deformation of the first lens will cause the imaging result obtained by the photosensitive chip to vary, which will cause the active calibration to fail to achieve the expected effect.

The above parameter ranges can be applied to the first lens made of glass, but it should be noted that these parameter ranges are not limited to the glass material, and they can also be applied to the first lens made of other materials.

Further, referring to FIG. 13 in combination, in an example of the present application, the first lens has the protrusion portion with a cross-sectional diameter L1 of 1.0-2.0 mm, and a height H1 of the protrusion portion may be 0.3-1.5 mm. Under this design, the thickness of the first lens at the optical area is larger, and the difficulty of optical design is increased. Generally speaking, the ratio of the diameter of the imaging surface of the first surface of the first lens to the diameter of the imaging surface of the third surface of the second lens is about 0.80-1.25. Further, since the first lens is bonded to the adhesive dispensing area of the second lens, in order to meet the requirements of the adhesion between the first lens and the second lens and provide a larger bonding area, the width of the adhesive dispensing area can be greater than 0.3 mm (the width refers to the radial dimension, that is, the dimension perpendicular to the optical axis). Preferably, the width of the adhesive dispensing area is between 0.5 mm and 0.8 mm, so as to satisfy the adhesive arrangement and avoid the excessive radial size of the second lens component as much as possible. Based on the above parameter constraints, and further consider the necessary size occupied by the connecting area between the optical area 211a of the second lens and the inner structure 211b (the adhesive dispensing area), and the connecting area between the inner structure area 211b (the adhesive dispensing area) and the outer structure area 211c (the bearing area), in this example, the aperture of the extension portion of the second lens barrel is greater than 2.5 mm. Preferably, the aperture of the extension portion of the second lens barrel is between 3.0 mm and 4.4 mm. The ratio of the cross-sectional diameter of the protrusion portion of the first lens to the aperture of the extension portion of the second lens barrel (that is, the aperture of the light inlet hole of the second lens barrel) is approximately 0.3-0.6. Preferably, the ratio of the cross-sectional diameter of the protrusion portion of the first lens to the aperture of the extension portion of the second lens barrel may be 0.35-0.5.

Further, in an example of the present application, the diameter of the cross section of the protrusion portion of the first lens is less than one third of the outer diameter of the second lens barrel. The outer diameter of the second lens barrel refers to the outer diameter of the largest dimension outside the second lens barrel. The largest outside dimension of the second lens barrel is generally located at the bottom of the second lens barrel (that is, the side close to the image side in the optical system). Generally speaking, a plurality of second lenses are fitted in the second lens barrel in order from small to large, and the lens with the largest size is usually located at the bottom end. Therefore, the largest outside size of the second lens barrel is generally located at the bottom of the second lens barrel. However, it should be noted that under special circumstances, the largest outer dimension of the second lens barrel may also be located in other positions. Further, in a preferred example, the outer diameter of the second lens barrel (that is, the outer diameter of the second lens barrel where the outer dimension is the largest) is not less than 4 mm.

Further, in an example of the present application, a refractive index of the manufacturing material of the first lens is 1.48-1.55. An Abbe number of the first lens may be 50.0-70.1. The first lens usually adopts an aspheric surface. When the first lens is made of glass material, the first lens is usually made by a molded glass process. Since molded glass requires the use of a die to press the glass for processing, usually a biconcave lens produced by the molded glass will cause greater damage to the die. Therefore, the first surface (i.e., the object side) of the first lens is preferably a convex surface. In this example, the first lens has a relatively thick thickness relative to the lateral dimension. Correspondingly, the refractive index of the lens molding material is preferably 1.48-1.55, and the Abbe number of the first lens is preferably 50.0-70.1, which can better control the imaging quality of the split lens.

Further, in an example of the present application, the field of view (i.e., FOV) of the optical lens is greater than 60°. As mentioned above, the optical lens of the present application has the first lens, and the first lens has the protrusion portion, which can extend into the light-through hole with a smaller aperture (referring to the light-through hole of the display screen), so the light incident surface (the optical area of the first surface of the first lens) of the optical lens can be closer to the upper surface of the display screen, so that the field of view of the optical lens is relatively less affected by the diameter of the small hole of the display screen. Therefore, in this example, the field of view (i.e., FOV) of the optical lens may be greater than 60°. Preferably, the field of view of the optical lens may be greater than 75°.

Further, in an example of the present application, the thickness of the ink layer of the first lens is greater than 5μm. Preferably, in order to make the ink layer have a better shading effect and at the same time to make the thickness of the ink layer less affect the height H1 of the protrusion portion 111, the thickness of the ink layer of the first lens may be 15-30 μm.

Further, in an example of the present application, in the first lens, the side surface of the protrusion portion, the first structure area of the first surface, the outer side surface of the first lens, and the second structure area on the second surface is subjected to a surface roughening treatment. The inner structure area, the outer structure area and the connecting area (the connecting area between the inner structure area and the outer structure area) of the topmost second lens can also be subjected to surface roughening treatment. The surface roughening treatment can be achieved, for example, by grinding. Roughening the above-mentioned area of the first lens can not only reduce the influence of stray light on the imaging of the lens, but also improve the bonding strength of the ink layer and the lens, so that the ink is not easy to fall off during the use of the lens, and therey reducing the impact of dirt on lens imaging. In this example, the roughening treatment can also make the surface of the first lens easier to adhere to other components. In a modified example, the roughened area of the surface may also be one, two or three of the side surface of the protrusion portion, the first structure area of the first surface, the outer side surface of the first lens, and the second structural area of the second surface.

Figure 20:
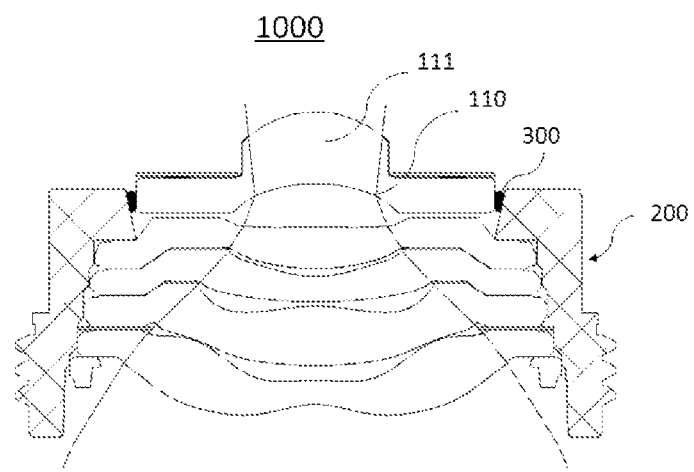
FIG. 20 shows a schematic cross-sectional view of the optical lens 1000 in a modified example of the present application.

Further, FIG. 20 shows a schematic cross-sectional view of the optical lens 1000 in a modified example of the present application. Referring to FIG. 20, in this example, the bonding position of the first lens and the second lens component is different from the example of FIG. 13. In this example, bonding of the first lens and the second lens component is realized by bonding the first lens and the side surface of the extension portion of the second lens barrel. The side surface of the extension portion can be understood as a hole wall of the light inlet hole of the second lens component (second lens barrel). The aperture of the light inlet hole can be gradually reduced from the object side to the image side, so as to arrange the first adhesive material to realize the bonding between the outer side surface of the first lens and the hole wall of the light inlet hole. Except for the bonding position, the rest of the structure and connection relationship of this example can refer to the example of FIG. 13, and will not be described again. The examples shown in FIGS. 14 and 15 can also be modified similarly, that is, by bonding the first lens and the side surface of the extension portion of the second lens barrel to realize the bonding of the first lens and the second lens component.

It should be noted that in the above-mentioned example, a minimum gap between the first lens and the topmost second lens is greater than 10 μm, and preferably, the minimum gap may be 30-100 μm.

The size of the minimum gap ensures that the active calibration has a sufficient adjustment gap, that is, it ensures that the first lens and the second lens do not interfere with each other during the active calibration (that is, the two will not collide with each other during the active calibration). The minimum gap may be the gap where the first adhesive material is arranged, or the gap at other positions.

Figure 16:
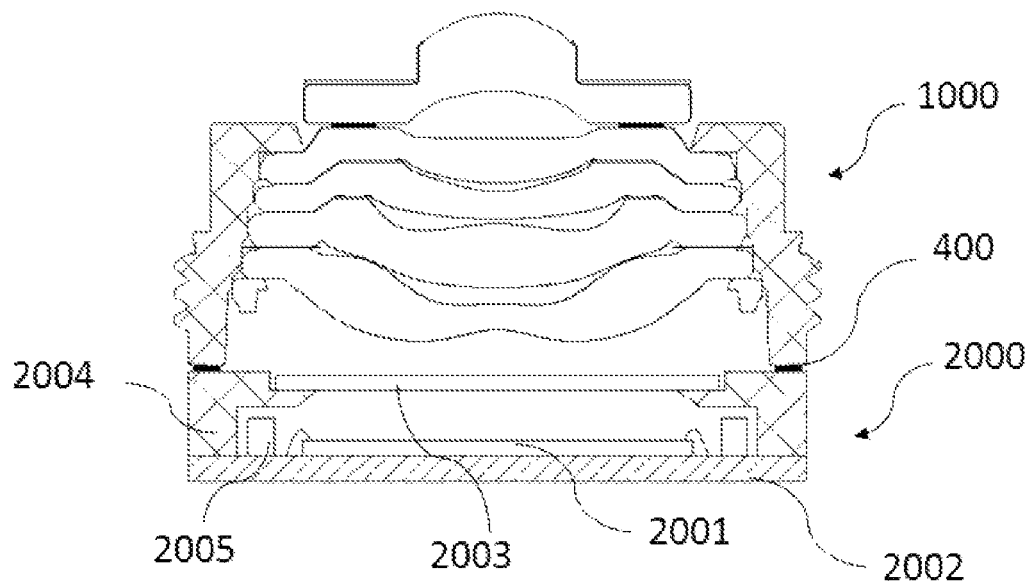
FIG. 16 shows a schematic cross-sectional view of a camera module according to an example of the present application.

Further, FIG. 16 shows a schematic cross-sectional view of a camera module according to an example of the present application. Referring to FIG. 16, according to an example of the present application, a camera module is provided. The camera module includes the optical lens 1000 and the photosensitive assembly 2000. The optical lens 1000 is mounted on the photosensitive assembly 2000. Specifically, the optical lens 1000 may be bonded to the photosensitive assembly 2000 through the second adhesive material 400. The optical lens may be the optical lens as shown in FIG. 13, and its specific structure will not be repeated here (it should be noted that FIG. 16 shows an adhesive material for bonding the SOMA sheet 121 and the first lens 110). The photosensitive assembly 2000 may includes the photosensitive chip 2001, the circuit board 2002, the color filter 2003, the lens holder 2004, and the electronic elements 2005. The photosensitive chip 2001 is pasted on the upper surface of the circuit board 2002. The lens holder 2004 is mounted on the upper surface of the circuit board 2002 and surrounds the photosensitive chip 2001. The top surface of the lens holder 2004 can be used as the mounting surface of the optical lens 1000. The color filter 2003 is mounted in the lens holder 2004. The electronic elements 2005 can also be mounted on the upper surface of the circuit board 2002. The photosensitive chip 2001 and the circuit board 2002 can be electrically connected through a wire bonding (wire bonding also referred to as "bonding") process. The connecting wires can be gold wires or other metal wires with good conductivity. Further, in an example of the present application, a total optical length (TTL) of the camera module may be 3.4-4.4 mm.

Further, in an example of the present application, in the optical lens, the side surface of the second lens barrel may have a cutting surface. Referring to FIG. 6, in an example of the present application, the optical lens 1000 includes the first lens 110 and the second lens component. The second lens component includes the second lens barrel 220 and a plurality of second lenses mounted in the second lens barrel 220 (the second lens is blocked in FIG. 6). The first lens 110 is bonded to the top surface of the second lens barrel 220. In this example, the outer side surface 223 of the second lens barrel 220 has the cutting surface 224. This cutting surface 224 can allow the front camera module to be arranged closer to the frame of the housing of the electronic device (for example, the mobile phone). FIGS. 7a, 7b, and 7c respectively show schematic top views of three kinds of second lens barrel cutting methods. Specifically, FIG. 7a shows a schematic top view of an example of an optical lens with a second lens barrel having a single cutting surface, FIG. 7b shows a schematic top view of an example of an optical lens with a second lens barrel having two cutting surfaces, FIG. 7c shows a schematic top view of an example of an optical lens with the second lens barrel having four cutting surfaces. In FIGS. 7a, 7b, and 7c, the shaded area represents the cutting area. Further, FIG. 8a shows a schematic diagram of an example in which a camera module with a cutting surface is provided close to the frame of a mobile phone, and FIG. 8b shows a schematic diagram of another example of a camera module with a cutting surface that is provided close to the frame of the mobile phone. It can be seen that cutting the side surface of the second lens barrel helps to provide the camera module at a position closer to the frame of the mobile phone. As shown in FIG. 8a, the optical lens 1000 of the front camera module may have a cutting surface, and the cutting surface may be provided at a positon close to the top frame 10 of the terminal device (for example, the mobile phone). As shown in FIG. 8b, the optical lens 1000 of the front camera module may have four cutting surfaces, wherein the cutting surfaces on the top and right sides can be respectively provided at positions close to the top frame 10a and the right frame 10b of the terminal device (such as the mobile phone). In FIGS. 8a and 8b, the x and y coordinate axes respectively represent two coordinate axes of the rectangular coordinate system on a plane perpendicular to the optical axis of the camera module (that is, the plane on which the display screen surface is located).

Further, in another example, the outer side surface of the first lens may also include a cutting surface, and the cutting surface may be one or more. The cutting method can refer to FIGS. 7*a*, 7*b*, and 7*c*.

Figure 17:
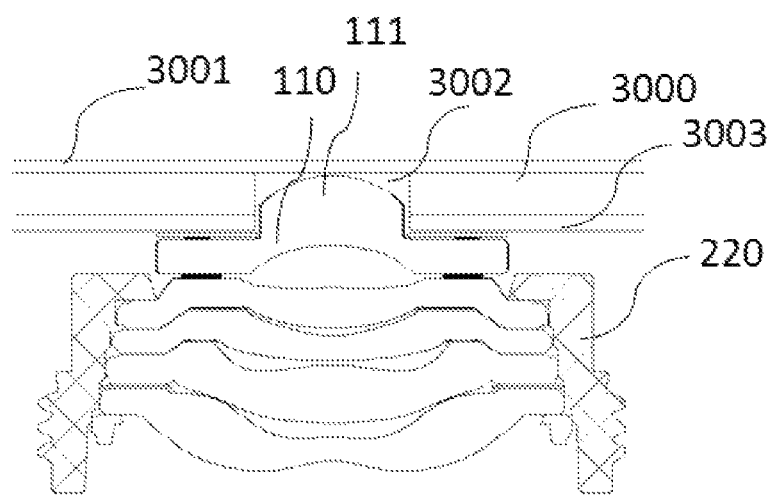
FIG. 17 shows a schematic cross-sectional view of an under-screen camera assembly in an example of the present application.

Further, FIG. 17 shows a schematic cross-sectional view of an under-screen camera assembly in an example of the present application. Referring to FIG. 17, according to an example of the present application, there also provides an under-screen camera assembly, which includes: the display screen 3000 and the camera module (it should be noted that only its optical lens is shown in FIG. 17, and its photosensitive assembly is not shown). The display screen 3000 has the light-through hole 3002. Specifically, the display screen 3000 has the front surface and the back surface, wherein the front surface is the side that displays the image, and the back surface is the opposite side. In the under-screen camera assembly, the display screen 3000 has the light-through hole 3002 for external light to enter the camera module located under the screen. The light-through hole 3002 may be a through hole or a blind hole. The front surface of the display screen 3000 can be covered with a transparent cover plate 3001, and the cover plate 3001 may not be penetrated at the light-through hole 3002 (as shown in FIG. 17). When the cover plate 3001 is not penetrated, that is, when the cover plate 3001 is complete, it can play a better role of dustproof and protection. It should be noted that in other examples, the cover plate at the light-through hole 3002 can also be punched through. Further, in this example, the optical lens of the camera module may be the optical lens 1000 as shown in FIG. 13, the optical lens has the first lens 110, and the first lens 110 has the protrusion portion 111. In this example, the protrusion portion 111 extends into the light-through hole 3002.

The display screen 3000 may further include the substrate 3003, which is located on the back surface of the display screen 3000, because the substrate 3003 may also be referred to as a backplane. In this example, the light-shielding member of the camera module may be located below the substrate 3003. In an example, the top surface of the light-shielding member may bear against the bottom surface of the substrate 3003. The top surface of the light-shielding member bears against the bottom surface of the substrate, so that the light incident surface of the optical lens can be closer to the upper surface of the display screen (or closer to the cover plate). In this way, the optical lens can obtain a larger field of view, and it is helpful to reduce the aperture of the light-through hole of the display screen under the premise of ensuring the amount of light entering the optical lens, thereby improving the visual effect of the display screen and user experience. Further, in this example, the gap between the protrusion portion 111 and the cover plate 3001 (or called the cover plate layer) of the display screen may be 0.08-0.5 mm. The gap between the protrusion portion 111 and the cover plate 3001 of the display screen can be understood as the gap between the arc top of the top surface of the protrusion portion 111 and the cover plate 3001 of the display screen. In this example, the non-optical area of the first lens can also be provided with a light-shielding layer. For the specific content, please refer to FIG. 3 and the corresponding examples in the foregoing, which will not be repeated here. In another example, a gap can be reserved between the top surface of the light-shielding member and the bottom surface of the substrate 3003. This design can prevent the camera module (or optical lens) from colliding with the display screen. It should be noted that in other examples of the present application, the SOMA sheet as the light-shielding member can also be replaced by the light-shielding member in the example shown in FIG. 14 or FIG. 15.

Figure 18:
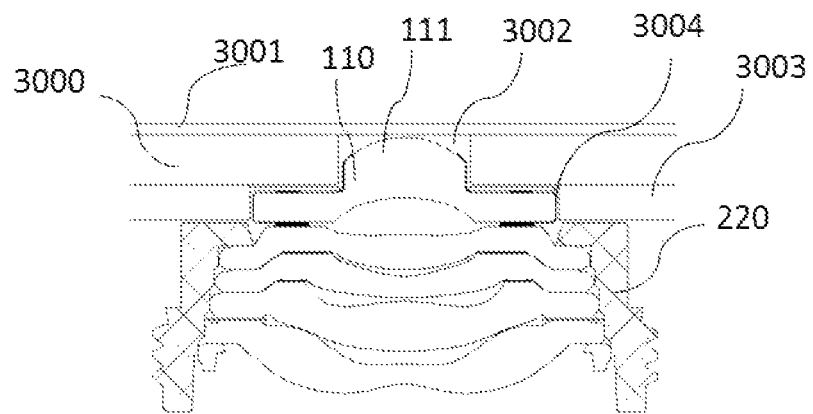
FIG. 18 shows a schematic cross-sectional view of an under-screen camera assembly in another example of the present application.

FIG. 18 shows a schematic cross-sectional view of an under-screen camera assembly in another example of the present application. Referring to FIG. 18, in another example of the present application, the substrate 3001 (or the backplane) of the display screen 3000 may have an opening 3004, and the diameter of the opening 3004 is larger than the diameter of the side surface (refer to FIG. 13 and the description of the corresponding example for the meaning of the outer side surface) of the first lens 110. The opening 3004 of the substrate 3003 may also be referred to as a mounting hole. The light-shielding member (the light-shielding member in this example is a SOMA sheet pasted on the first structure area) and the first structure area of the first lens 110 may be located in the opening 3004. That is, the light-shielding member and at least a part of the outer side surface of the first lens 110 are located in the opening 3004 (i.e., the mounting hole) of the substrate 3003. In this solution, the protrusion portion 111 can more fully extend into the light-through hole 3002 of the display screen 3000, so that the light incident surface of the optical lens is closer to the upper surface of the display screen (or closer to the cover plate). In this way, the optical lens can obtain a larger field of view, and it is helpful to reduce the aperture of the light-through hole of the display screen under the premise of ensuring the amount of light entering the optical lens, thereby improving the visual effect of the display screen and the user experience. In this example, the gap between the protrusion portion and the cover plate (or called the cover plate layer) of the display screen may be 0.08-0.5 mm. The gap between the protrusion portion 111 and the cover plate 3001 of the display screen can be understood as the gap between the arc top of the top surface of the protrusion portion 111 and the cover plate 3001 of the display screen. In this example, the non-optical area of the first lens can also be provided with a light-shielding layer. For the specific content, please refer to FIG. 3 and the corresponding examples in the foregoing, which will not be repeated here. It should be noted that in other examples of the present application, the SOMA sheet as the light-shielding member can also be replaced by the light-shielding member in the example shown in FIG. 14 or FIG. 15.

In the foregoing example, the display screen may be an OLED display screen or an LCD display screen.

Further, according to an example of the present application, there also provides a method for manufacturing an optical lens, which includes the following steps S1-S4.

Step S1 is preparing the first lens, the second lens component and the light-shielding member that are separated from each other. Still referring to FIG. 13, the first lens 110 has the first surface 112 on the object side and the second surface 117 on the image side, and the central area of the first surface 112 protrudes toward the object side to form the protrusion portion 111, the top surface 113 of the protrusion portion 111 forms the optical area 113*a* for imaging, and the first surface 112 also has the first structure area 115 surrounding the protrusion portion 111, and the side surface 114 of the protrusion portion 111 is connected to the optical area 113*a* and the first structure area 115. The second lens component 200 includes the second lens barrel 220 and a plurality of second lenses 210 mounted inside the second lens barrel 220, and the plurality of second lenses 210 and the first lens 110 together constitute the imageable optical system. The light-shielding member includes an annular light-shielding portion.

Step S2 is pre-positioning the first lens 110 and the second lens component 200. In this step, the first lens 110, the second lens component 200, and the photosensitive assembly (which can be a photosensitive assembly to be assembled, or a photosensitive assembly or a photosensitive chip equipped in the active calibration device) are arranged along the optical axis, so that the optical system composed of the first lens 110 and the second lens component 200 is imageable. At this time, the first lens 110 and the second lens component 200 can be regarded as a split lens. In this example, the second lens component 200 may be provided on a stage, the stage may have a light-through hole, and the photosensitive assembly may be provided under the light-through hole of the stage. The first lens 110 can be clamped and moved by a six-axis movable clamp. The six axes will be explained in detail in step S3. The clamp can clamp the outer side surface of the first lens to capture and move the first lens 110. Since in this example, the outer side surface of the first lens can partially extend into the light inlet hole of the second lens barrel, the clamp can only clamp the upper half of the outer side surface of the first lens, that is, only the part of the outer side surface of the first lens close to the object side can be clamped. In another example, the clamp can capture and move the first lens 110 by clamping the side surface of the protrusion portion.

Step S3 is performing the active calibration. In this step, the photosensitive assembly is energized to obtain the image formed by the split lens, and the imaging quality of the split lens and its adjustment amount are calculated through image algorithms such as SFR, MTF, etc. The relative position between the first lens component (the first lens component is the first lens 110 in this example) and the second lens component is actively adjusted in at least one of the six-axis directions in real time according to the adjustment amount. After one or more adjustments, the imaging quality of the split lens (mainly including a peak, a field curvature, an astigmatism and other optical parameters) reaches the target value. Wherein, the six-axis directions can be x, y, z, u, v, and w directions, wherein the x, y, and z directions are horizontal and vertical directions, that is, the directions of the three coordinate axes in the three-dimensional rectangular coordinate system, and u, v, and w direction are the direction of rotation around the x, y, and z axes, respectively.

Step S4 is bonding the first lens 110 and the second lens component 200 by the first adhesive material 300. After the first adhesive material 300 is cured, the first lens 300 and the second lens component 200 can be maintained at the relative positions determined by the active calibration.

Step S5 is bonding the light-shielding member and the combination of the first lens and the second lens component, so that the annular light-shielding portion is provided above the first structure area. In the foregoing example, the arrangement of the first adhesive material can be performed before the pre-positioning (i.e., step S2), or can be performed after completing the active calibration (i.e., step S3). When the arrangement of the first adhesive material is executed after completing the active calibration (i.e., step S3), the first lens component is removed firstly, and then the first adhesive material is arranged in the adhesive dispensing area (the inner structure area) of the topmost second lens of the second lens component (or the first adhesive material is arranged on the side wall of the light inlet hole of the second lens component), and then step S4 is performed to cure the first adhesive material. In this application, the first adhesive material is suitable for curing by at least one of visible light, ultraviolet light, baking and the like.

Further, in an example of the present application, in the step S1, the light-shielding member may be a first lens barrel, wherein the top of the first lens barrel extends toward the first lens to form the annular light-shielding portion. In the step S5, the first lens barrel may be bonded to the second lens barrel through a third adhesive material, wherein the third adhesive material is arranged on the top surface of the second lens barrel, and the third adhesive material surrounds the outer side of the first lens.

Further, in another example of the present application, in the step S1, the light-shielding member is a annular SOMA sheet. In the step S5, the bottom surface of the SOMA sheet is bonded to the first structure area.

Further, in yet another example of the present application, in the step S1, the light-shielding member includes an annular support member and a SOMA sheet, wherein the SOMA sheet has an annular shape and constitutes the annular light-shielding portion. In the step S5, the bottom surface of the annular support member is bonded to the top surface of the second lens barrel, so that the annular support member surrounds the first lens, and then the SOMA sheet is bonded on the top surface of the annular support member.

Further, in an example of the present application, in the step S1, the first lens is made by a molded glass process, and the protrusion portion is processed by a removal process such as cutting or polishing, so that the included angle between the side surface of the protruding portion and the optical axis of the optical lens is less than 15°.

Further, according to an example of the present application, there also provides a method for manufacturing a camera module, which includes step a and step b.

Step a: manufacturing an optical lens according to the method for manufacturing an optical lens in the foregoing example (steps S1-S4).

Step b: assembling the optical lens and the photosensitive assembly together to obtain a camera module.

Wherein, in the step b, based on the active calibration process, the optical lens and the photosensitive assembly are bonded together through a second adhesive material. In one example, the optical lens can be assembled firstly, and then the optical lens and the photosensitive assembly can be assembled.

The process of assembling the optical lens and the photosensitive assembly can be a traditional active adjustment (AA) process (AA process refers to the active adjustment process without adjusting the optical system itself, that is, by adjusting the relative position between the optical lens and the photosensitive assembly, the lens and the photosensitive assembly are adhered and fixed), or the traditional holder attaching (HA) process (HA process is directly attaching the lens to the photosensitive assembly by means of mechanical positioning such as visual recognition).

Further, in another example of the present application, in the step b, active calibration may be performed between the second lens component and the photosensitive assembly. In addition, the active calibration between the first lens and the second lens component in step S3 and the active calibration between the second lens component and the photosensitive assembly in step b can be performed simultaneously. Then the first lens and the second lens component (which can be adhered by the first adhesive material) and the second lens component and the photosensitive assembly (which can be adhered by the second adhesive) are adhered respectively, so as to constitute a complete camera module.

The above description is only a preferred example of the present application and an explanation of the applied technical principles. Those skilled in the art should understand, the scope of the invention involved in this application is not limited to the technical solutions formed by the specific combination of the above-mentioned technical features, and at the same time, it should also cover other technical solutions formed by any combination of the above technical features or their equivalent features without departing from the inventive concept. For example, the above-mentioned features and the technical features disclosed in this application (but not limited to) with similar functions can be mutually replaced to form a technical solution.

The invention claimed is:

1. An optical lens, characterized by comprising:
a first lens having a first surface on an object side and a second surface on an image side, wherein a central area of the first surface protrudes toward the object side to form a protrusion portion, and a top surface of the protrusion portion forms an optical area for imaging, and the first surface further has a first structure area surrounding the protrusion portion, and a side surface of the protrusion portion extending upwards from and perpendicular to the first structure area connects the optical area and the first structure area; and
a second lens component including a second lens barrel and at least one second lens mounted inside the second lens barrel, wherein the at least one second lens and the first lens together form an imagable optical system, and a top of the second lens barrel has an extension portion formed by extending inwardly, and a center part of the extension portion is formed with a light inlet hole of the second lens component, and the topmost second lens of the at least one second lens has a third surface on the object side and a fourth surface on the image side, and the third surface includes an optical area at center, an inner structure area surrounding the optical area, and an outer structure area surrounding the inner structure area, and the outer structure area bears against a bottom surface of the extension portion, and the inner structure area is exposed outside the extension portion;
wherein, the first lens is adhered with the second lens component,
a diameter of a cross section of the protrusion portion is 1.0-2.0 mm,
a height of the protrusion portion is 0.3-1.5 mm, and
a ratio of the diameter of the cross section of the protrusion portion to an aperture of a light inlet hole of the second lens barrel is 0.3-0.6.

2. The optical lens according to claim 1, wherein the inner structure area and the outer structure area are both planes, and the inner structure area and the outer structure area are perpendicular to an optical axis of the second lens, and the inner structure area is an adhesive dispensing area, and the second surface of the first lens is bonded to the adhesive dispensing area of the topmost second lens.

3. The optical lens according to claim 1, wherein a position of the first structure area is higher than a top surface of the second lens barrel.

4. The optical lens according to claim 1, wherein the first lens and the second lens component are bonded by a first adhesive material, and the first adhesive material is cured to support the first lens and the second lens component so that relative positions of the first lens and the second lens component are maintained at relative positions determined by an active calibration, and the active calibration is a process of adjusting the relative positions of the first lens and the second lens component according to an actual imaging result of the optical system, and a central axis of the first lens and a central axis of the second lens component have an included angle that is not zero.

5. The optical lens according to claim 4, wherein the second surface has an optical area for imaging and a second structural area surrounding the optical area, and a position of the second structure area is lower than the top surface of the second lens barrel, and the first adhesive material is located between an outer side surface of the first lens and the extension portion.

6. The optical lens according to claim 3, wherein in the third surface, a position of the inner structure area is higher than that of the outer structure area, and the inner structure area is connected to the outer structure area through a connecting area.

7. The optical lens according to claim 6, wherein a light-shielding layer is attached to the connecting area.

8. The optical lens according to claim 1, wherein a light-shielding layer is attached to the side surface of the protrusion portion, the first structure area, and an outer side surface of the first lens.

9. The optical lens according to claim 1, wherein the first lens is a single lens or a composite lens formed by interfitting a plurality of sub-lenses, and there are a plurality of the second lenses and the plurality of the second lenses are assembled together by the second lens barrel.

10. The optical lens according to claim 1, wherein each of at least two adjacent second lenses have an optical area, an inner structure area surrounding the optical area, and an outer structure area surrounding the inner structure area, and a position of the inner structure area is higher than that of the outer structure area, and the outer structure area is connected to the outer structure area by an inclined connecting area, and the at least two adjacent second lenses are fitting, and a SOMA sheet is provided between the at least two adjacent second lenses, and the SOMA sheet is located between the two inner structure areas or between the two outer structure areas.

11. The optical lens according to claim 1, wherein a top surface of the protrusion portion has a transition area, and the transition area is located at an edge of the top surface, and the transition area is attached with a light-shielding layer.

12. The optical lens according to claim 1, wherein one or more of the side surface of the protrusion portion, the first structure area, and the outer side surface of the first lens are subjected to a surface roughening treatment.

13. The optical lens according to claim 1, wherein the second lens barrel or an outer side surface of the first lens includes at least one cutting surface.

14. The optical lens according to claim 1, wherein the optical lens further includes a light-shielding member including an annular light-shielding portion, and the annular light-shielding portion is provided above the first structure area.

15. The optical lens according to claim 14, wherein the light-shielding member is an annular SOMA sheet, and the SOMA sheet is bonded to the first structure area.

16. The optical lens according to claim 14, wherein the light-shielding member is a first lens barrel, and a bottom surface of the first lens barrel is bonded to a top surface of the second lens barrel, and a top portion of the first lens barrel extends toward the first lens to form the annular light-shielding portion.

17. The optical lens according to claim 16, wherein there is no adhesive material provided between the annular light-shielding portion and the first structure area.

18. A camera module, characterized by comprising:
   the optical lens of claim 1; and
   a photosensitive assembly, wherein the optical lens is mounted on the photosensitive assembly.

19. An under-screen camera assembly, characterized by comprising:
   a display screen having a light-through hole; and
   the camera module of claim 18, wherein the protrusion portion of the camera module extends into the light-through hole.

\* \* \* \* \*